US009799232B2

(12) United States Patent
Sako et al.

(10) Patent No.: US 9,799,232 B2
(45) Date of Patent: Oct. 24, 2017

(54) INFORMATION PROCESSING APPARATUS AND STORAGE MEDIUM

(71) Applicant: SONY CORPORATION, Tokyo (JP)

(72) Inventors: Yoichiro Sako, Tokyo (JP); Mitsuru Takehara, Tokyo (JP); Hiroyuki Hanaya, Kanagawa (JP); Tomoya Onuma, Shizuoka (JP); Yuki Koga, Tokyo (JP); Kazunori Hayashi, Tokyo (JP); Yasunori Kamada, Kanagawa (JP); Takayasu Kon, Tokyo (JP); Kohei Asada, Kanagawa (JP); Akira Tange, Tokyo (JP); Takatoshi Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 307 days.

(21) Appl. No.: 14/225,530

(22) Filed: Mar. 26, 2014

(65) Prior Publication Data
US 2014/0315161 A1   Oct. 23, 2014

(30) Foreign Application Priority Data

Apr. 18, 2013   (JP) .................................. 2013-087526

(51) Int. Cl.
*G09B 19/00*   (2006.01)
(52) U.S. Cl.
CPC ................................ *G09B 19/0092* (2013.01)
(58) Field of Classification Search
CPC ............................. G09B 19/00; G09B 19/0092
USPC ........................................................ 434/127
See application file for complete search history.

(56) References Cited

U.S. PATENT DOCUMENTS

| 5,858,967 | A   | * | 1/1999 | Weigle   | ............... | C07K 14/5759 |
|           |     |   |        |          |                | 435/69.1     |
| 6,508,762 | B2  | * | 1/2003 | Karnieli | ............... | G06F 19/324  |
|           |     |   |        |          |                | 128/921      |
| 6,554,439 | B1  | * | 4/2003 | Teicher  | ................... | F21S 8/006   |
|           |     |   |        |          |                | 315/360      |
| 7,077,806 | B2  | * | 7/2006 | Ackermann | ........... | G06Q 50/24   |
|           |     |   |        |          |                | 128/904      |

(Continued)

FOREIGN PATENT DOCUMENTS

| JP | 2008-193570 | 8/2008 |
| JP | 2009-151616 | 7/2009 |

(Continued)

OTHER PUBLICATIONS

Nov. 8, 2016, JP communication issued for related JP application No. 2013-087526.

(Continued)

*Primary Examiner* — Sam Yao
*Assistant Examiner* — Alvin Carlos
(74) *Attorney, Agent, or Firm* — Paratus Law Group, PLLC

(57) ABSTRACT

There is provided an information processing apparatus including a determination unit configured to determine whether a user is consuming food and drink or whether food and drink is present in a periphery of the user, and a control unit configured to carry out control to output a control signal to an adding unit that adds a lighting effect to one of the food and drink present in a real space and picked-up images of the food and drink in accordance with a determination result of the determination unit.

20 Claims, 13 Drawing Sheets

(56) References Cited

U.S. PATENT DOCUMENTS

| | | | | |
|---|---|---|---|---|
| 8,345,930 | B2* | 1/2013 | Tamrakar | G06T 7/0002 |
| | | | | 382/110 |
| 8,363,913 | B2* | 1/2013 | Boushey | G06K 9/00 |
| | | | | 128/921 |
| 8,439,683 | B2* | 5/2013 | Puri | G09B 19/0092 |
| | | | | 434/127 |
| 9,104,943 | B2* | 8/2015 | Sato | G06K 9/4642 |
| 9,165,398 | B2* | 10/2015 | Kim | G06Q 10/00 |
| 2002/0022774 | A1* | 2/2002 | Karnieli | G06F 19/324 |
| | | | | 600/300 |
| 2003/0076983 | A1* | 4/2003 | Cox | G06F 19/3475 |
| | | | | 382/110 |
| 2006/0178947 | A1* | 8/2006 | Zsigmond | B07C 5/34 |
| | | | | 705/26.1 |
| 2006/0199715 | A1* | 9/2006 | Leon | A61M 21/00 |
| | | | | 482/148 |
| 2009/0012433 | A1* | 1/2009 | Fernstrom | A61B 5/1112 |
| | | | | 600/593 |
| 2010/0111383 | A1* | 5/2010 | Boushey | A23L 1/293 |
| | | | | 382/128 |
| 2011/0243392 | A1* | 10/2011 | Miyahara | G06Q 30/02 |
| | | | | 382/110 |
| 2011/0318717 | A1* | 12/2011 | Adamowicz | G09B 19/0092 |
| | | | | 434/127 |
| 2012/0096405 | A1* | 4/2012 | Seo | G06F 3/04886 |
| | | | | 715/825 |
| 2012/0212499 | A1* | 8/2012 | Haddick | G02B 27/0093 |
| | | | | 345/589 |

FOREIGN PATENT DOCUMENTS

| | | |
|---|---|---|
| JP | 2010-237516 | 10/2010 |
| JP | 2010-282414 | 12/2010 |
| WO | WO2013/046394 A1 | 4/2013 |

OTHER PUBLICATIONS

Yuji Matsuda, et al., Recognition of Multiple-Food Images by Detecting Candidate Regions, Transactions of the Institute of Electronics, Information and Communication Engineers, Aug. 1, 2012, vol. J95-D No. 8, pp. 1554-1655.

Masayuki Ishikawa, Picture of Meals can be Deliciously Taken! (Camera application special for meals), "Meal Camera" [online], andronavi, Mar. 6, 2011, [searched on Oct. 28, 2016]. Internet, <URL: http://andronavi.com/2011/03/75326>, pp. 1-6.

Takuji Narumi, Augmenting Eating Experience using Cross-model Interfaces, IEICE Technical Report, Oct. 4-5, 2012, vol. 112 No. 112, pp. 95-100.

Maki Mori, et al., A System to Enrich Food Color, IEICE Technical Report, Jan. 24-25, 2008, vol. 107 No. 454, pp. 69-72.

* cited by examiner

INFORMATION PROCESSING APPARATUS AND STORAGE MEDIUM

CROSS REFERENCE TO RELATED APPLICATIONS

This application claims the benefit of Japanese Priority Patent Application JP 2013-087526 filed Apr. 18, 2013, the entire contents of which are incorporated herein by reference.

BACKGROUND

The present disclosure relates to an information processing apparatus and a storage medium.

In recent years, an apparatus for supporting dietary management has been proposed.

As one example, JP2008-193570A discloses an image pickup system that includes a lighting device that lights a dining table on which cooking is provided and an image pickup device installed in the lighting device in a state that enables image pickup of the dining table. Such system is capable of easily recording food and drink and has a reduced cost since dedicated camera lighting, such as a flash, is unnecessary.

JP2009-151616A discloses an event performance system that can increase audience satisfaction by carrying out a performance that changes the lighting produced by a lighting device in accordance with the passing of time as an event progresses and also in accordance with the audience themselves.

SUMMARY

However, JP2008-193570A, does not consider changing the lighting in response to whether a meal is presently being eaten or in accordance with the ingredients in the cooking.

Also, although making changes to lighting as part of an event-type performance is suggested in JP2009-151616A, there is no consideration of lighting control or the like in accordance with the type of cooking or ingredients to make the cooking or ingredients look more delicious, or of lighting control to suppress the appetite.

For this reason, the present disclosure proposes a novel and improved information processing apparatus and storage medium that are capable of providing dietary support by adding lighting effects to food and drink.

According to an embodiment of the present disclosure, there is provided an information processing apparatus including a determination unit configured to determine whether a user is consuming food and drink or whether food and drink is present in a periphery of the user, and a control unit configured to carry out control to output a control signal to an adding unit that adds a lighting effect to one of the food and drink present in a real space and picked-up images of the food and drink in accordance with a determination result of the determination unit.

According to an embodiment of the present disclosure, there is provided a storage medium having a program stored therein, the program causing a computer to function as a determination unit configured to determine whether a user is consuming food and drink or whether food and drink is present in a periphery of the user, and a control unit configured to carry out control to output a control signal to an adding unit that adds a lighting effect to one of the food and drink present in a real space and picked-up images of the food and drink in accordance with a determination result of the determination unit.

According to one or more embodiments of the present disclosure, it is possible to providing dietary support by adding lighting effects to food and drink.

DETAILED DESCRIPTION OF THE EMBODIMENT(S)

Figure 1:
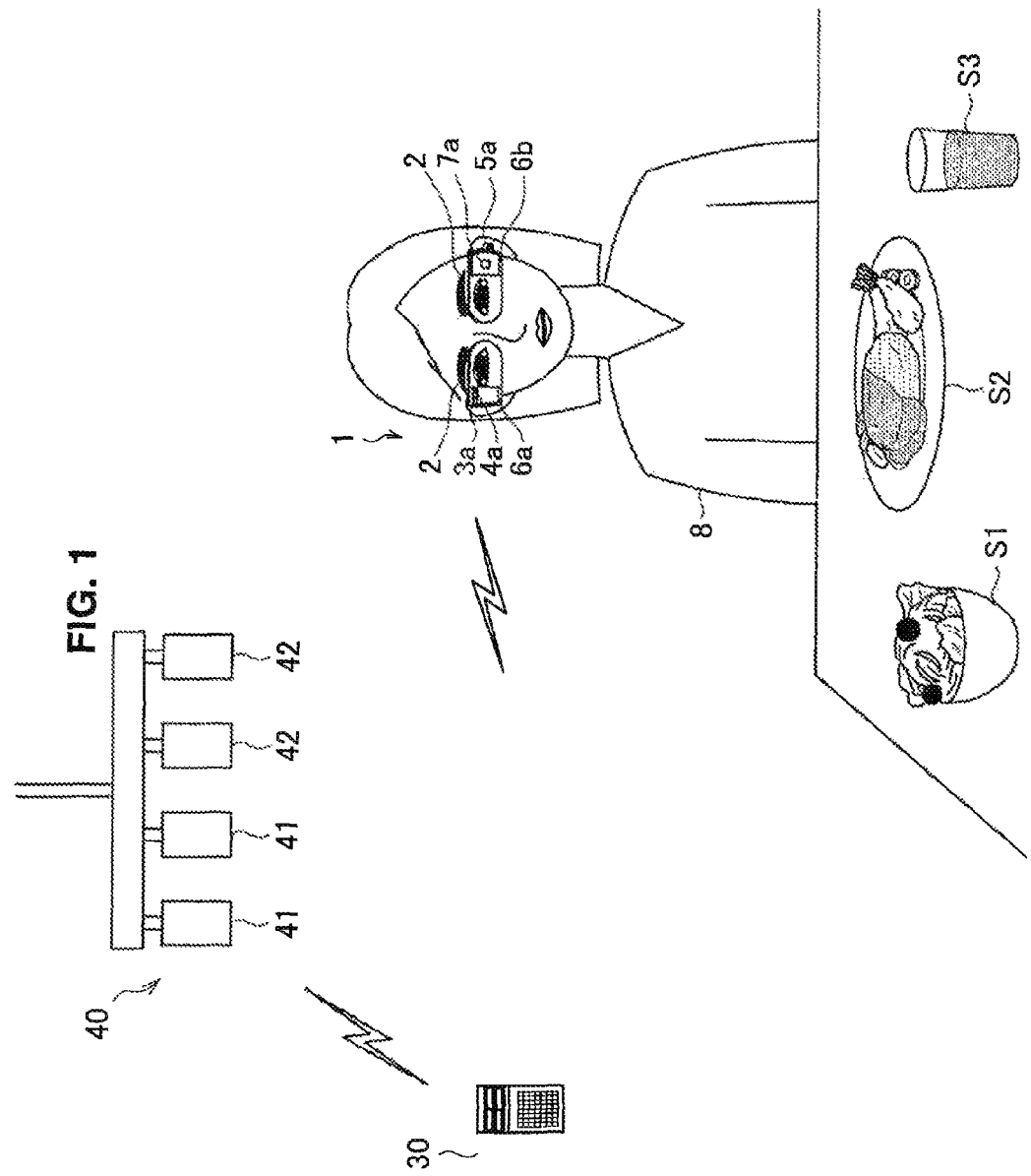
FIG. 1 is a diagram useful in explaining an overview of a lighting system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following description is given in the order indicated below.

1. Overview of Lighting System According to an Embodiment of the Present Disclosure
2. Fundamental Configuration
   2-1. Fundamental Configuration of HMD
   2-2. Fundamental Configuration of Server 3. Operation Processing
  3-1. First Lighting Control
  3-2. Second Lighting Control
  3-3. Image Processing
  3-4. Combined Type
  3-5. Combined Type Mode Compatibility
4. Other Embodiments
5. Conclusion

1. Overview of Lighting System According to an Embodiment of the Present Disclosure First, an overview of a lighting system according to an embodiment of the present disclosure will be described with reference to FIG. 1.

FIG. 1 is a diagram useful in explaining an overview of a lighting system according to an embodiment of the present disclosure. As shown in FIG. 1, the lighting system according to the present embodiment includes an HMD 1 mounted on the user 8, a server 30, and a lighting apparatus 40.

The server 30 (information processing apparatus) is present on a network and is capable of communicating with the HMD 1 and the lighting apparatus 40 via a wireless LAN or the like.

As shown in FIG. 1, the HMD (Head Mounted Display) 1 is in the form of eyeglasses and is mounted on the user 8. As one example, the HMD 1 has a mounting unit with a frame construction that goes halfway around the head at the rear from both sides of the head as shown in FIG. 1, and is mounted on the user 8 by placing on both ear lobes.

Also, in the mounted state, the HMD 1 is configured so that a pair of display units 2 for the left eye and the right eye are disposed at locations immediately in front of both eyes of the user 8, or in other words where lenses of ordinary eyeglasses would be disposed. As one example, picked-up images of cooking S1, S2, S3 present in the actual space that have been picked up by an image pickup lens 3a are displayed on the display units 2. The display units 2 may be a transmissive type, and by making the display units 2 of the HMD 1 a "pass-through" type, that is, transparent or semi-transparent, it is possible for the user 8 to wear the HMD 1 all of the time like eyeglasses with no obstruction to normal life.

Also, in a state where the HMD 1 is mounted on the user 8, as shown in FIG. 1 the image pickup lens 3a is disposed so as to face forward so as to pick up images with the direction in which the user is looking as the shooting direction. A light emitting unit 4a that emits light in the direction of image pickup by the image pickup lens 3a is also provided. The light emitting unit 4a is formed of an LED (Light Emitting Diode), for example.

Also, although only the left ear is shown in FIG. 1, a pair of earphone speakers 5a that can be inserted into the user's right earhole and left earhole when the HMD 1 is mounted are also provided. Microphones 6a, 6b that collect external sound are disposed to the right of the display unit 2 for the right eye and to the left of the display unit 2 for the left eye.

As shown in FIG. 1, a projection lens 7a is also disposed on the HMD 1 facing forward so as to be capable of projecting images with the direction in which the user is looking as the projection direction when the HMD 1 is mounted on the user 8.

Note that the external appearance of the HMD 1 shown in FIG. 1 is one example and a variety of constructions are conceivable for mounting the HMD 1 on the user. The HMD 1 may be formed of a mounting unit in the form of ordinary eyeglasses or a head-mounted unit and as an embodiment of the present disclosure, it is sufficient for the display units 2 to be provided close to and in front of the user's eyes. The display units 2 may be constructed of a pair of displays corresponding to both eyes as above, or may be a single display corresponding to one eye.

Although the image pickup lens 3a and the light emitting unit 4a that emits light are disposed facing forward on the right eye side in the example shown in FIG. 1, such components may be disposed on the left eye side or may be disposed on both sides.

Also, although the projection lens 7a is disposed facing forward on the left eye side in the example shown in FIG. 1, the projection lens 7a may be may be disposed on the right eye side or may be disposed on both sides.

The earphone speakers 5a are not necessarily be left and right stereo speakers and instead a single earphone speaker 5a may be mounted in one ear only. It is also possible to provide only one of the microphones 6a and 6b.

In addition, configurations that do not include the microphones 6a, 6b, the earphone speakers 5a, the light emitting unit 4a, or the projection lens 7a are also conceivable.

The lighting apparatus 40 includes incandescent lighting units 41 and fluorescent lighting units 42 and carries out light control of at least one of the incandescent lighting units 41 and the fluorescent lighting units 42 in accordance with instructions from the HMD 1 or the server 30.

Background

When the characteristics of incandescent lighting and fluorescent lighting are compared, the following information is generally known.

As one example, fluorescent lighting can provide light of the same brightness as incandescent lighting with lower power consumption than incandescent lighting. That is, fluorescent lighting has a characteristic of being brighter than incandescent lighting for the same wattage. The operating life of fluorescent lamps is also generally longer than incandescent lamps. Accordingly, the running cost is lower when fluorescent lighting is used.

Meanwhile, from the viewpoint of operability, since the time taken from turning on until the brightness stabilizes is shorter for incandescent lighting than for fluorescent lighting, incandescent lighting is often used in toilets, entrances, hallways, and the like where lighting is only used for a comparatively short time.

In this way, fluorescent lighting and incandescent lighting have respective characteristics, and appropriate lighting is installed in respective rooms in accordance with the application, purpose, and priorities. As examples, fluorescent lighting that has a low running cost is suited to living rooms, dining rooms, kitchens, bedrooms, and the like where lighting is used for an extended period. In particular, daylight-colored fluorescent lighting, which makes details and text bright and easy to see, is suited for detailed work, reading, and studying.

However, it is also known that incandescent lighting is favorable than fluorescent lighting as lighting that makes cooking looking delicious. During a meal, while deliciousness experienced by the sense of taste is obviously important for food, deliciousness (here meaning an attractive appearance) experienced by the sense of sight, another of the five human senses, is also important.

More specifically, due to their gentle coloring, incandescent lamps emphasize reds and yellows that stimulate the appetite, making food more vivid, and since shadows are more likely to be formed when lighting with incandescent lamps, cooking takes on a three-dimensional appearance, which makes the cooking appear much more delicious. On the other hand, since light from fluorescent lamps is whitish light like daytime sunlight and has an overall uniform brightness which produces fewer shadows, cooking takes on a flattish appearance, thereby failing to produce an effect of making the cooking look delicious. In this way, the deliciousness of food experienced by the sense of sight differs between lighting with incandescent lighting and lighting with fluorescent lighting, so that lighting with incandescent lighting has an effect of increasing appetite and lighting with fluorescent lighting has an effect of suppressing appetite.

Accordingly, incandescent lighting is normally suited to lighting at mealtimes and as described earlier, fluorescent lighting is suited to tasks outside mealtimes, such as detailed work and reading. In the case of an open-plan space such as a combined living, dining and kitchen (LDK) area, if incandescent lighting is provided in only the dining area and fluorescent lighting is provided in other areas, light of different colors will be present in the same space, which will feel unnatural.

The lighting systems according to the respective embodiments of the present disclosure were created with the focus on the situation described above. The lighting systems according to the respective embodiments of the present disclosure are capable of providing dietary support by adding a specified lighting effect (an incandescent lighting effect or a fluorescent lighting effect) to food and drink when the user is having a meal or when food and drink is present.

The adding of such lighting effects to food and drink according to the present embodiment is carried out by switching between the incandescent lighting units 41 and the fluorescent lighting units 42 provided in the lighting apparatus 40, by carrying out image processing on picked-up images of the cooking S1 to S3 picked up by the image pickup lens 3a, or by projection using the projection lens 7a of the HMD 1. The adding of such lighting effects according to the present embodiment will now be described with reference to FIG. 4 to FIG. 12.

This completes the description of an overview of a lighting system according to the present embodiment. Next, the functional configurations of the HMD 1 and the server 30 (information processing apparatus) included in the lighting system according to the present embodiment will now be described with reference to FIG. 2 to FIG. 6.

2. Fundamental Configuration 2-1. Fundamental Configuration of HMD

Figure 2:
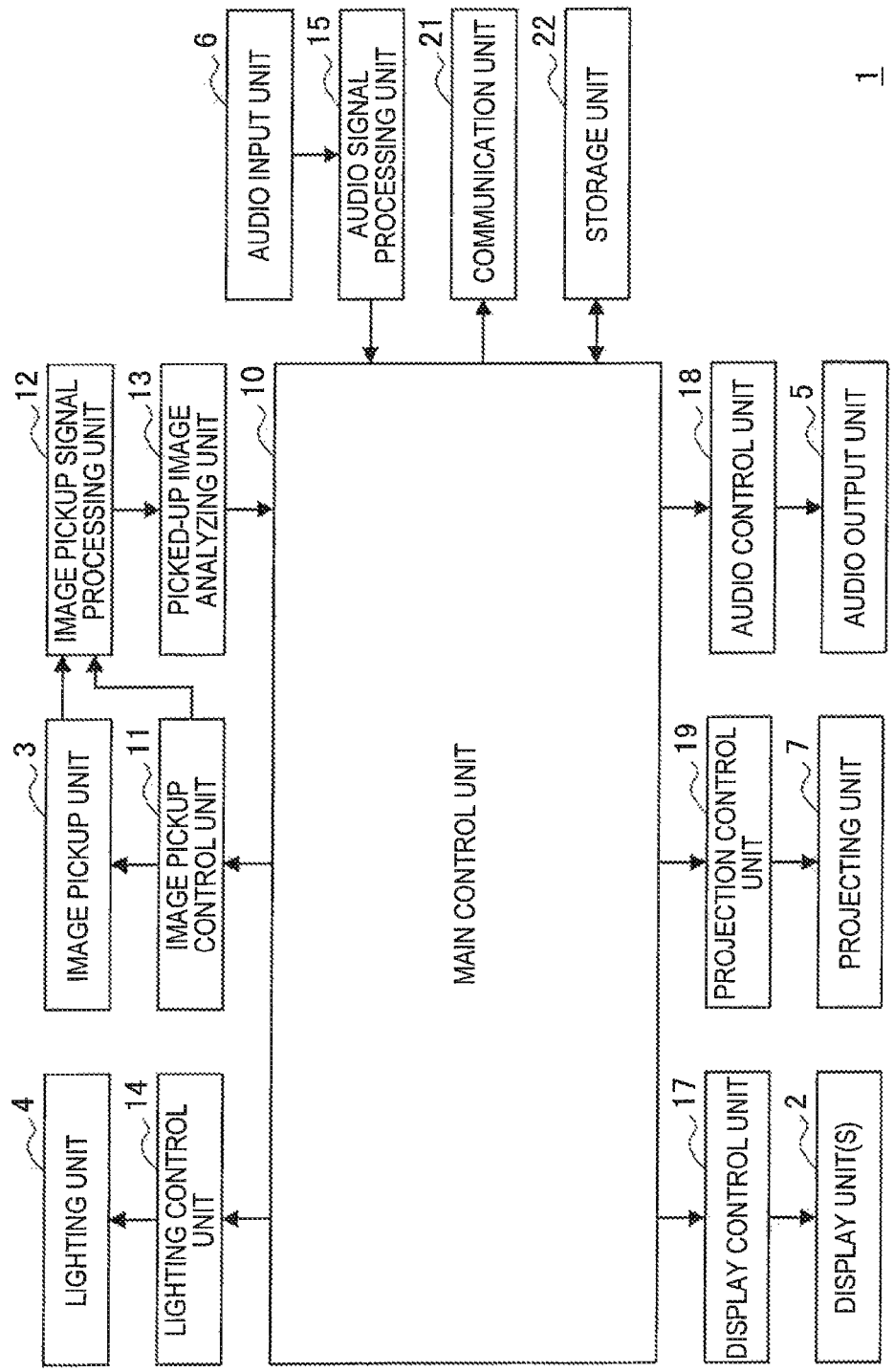
FIG. 2 is a block diagram showing one example of the internal configuration of an HMD according to the present embodiment.

FIG. 2 is a block diagram showing one example of the internal configuration of the HMD 1 according to the present embodiment. As shown in FIG. 2, the HMD 1 according to the present embodiment includes the display units 2, an image pickup unit 3, a lighting unit 4, an audio output unit 5, an audio input unit 6, a projecting unit 7, a main control unit 10, an image pickup control unit 11, an image pickup signal processing unit 12, a picked-up image analyzing unit 13, a lighting control unit 14, an audio signal processing unit 15, a display control unit 17, an audio control unit 18, a projection control unit 19, a communication unit 21, and a storage unit 22.

Main Control Unit 10

As one example, the main control unit 10 is configured using a microcomputer equipped with a CPU (Central Processing Unit), a ROM (Read Only Memory), a RAM (Random Access Memory), a nonvolatile memory, and an interface unit, and controls the various elements of the HMD 1.

The main control unit 10 according to the present embodiment carries out control so that picked-up images that have been picked up by the image pickup unit 3 are transmitted via the communication unit 21 to the server 30. The main control unit 10 may successively transmit picked-up images, which have been continuously picked up by the image pickup unit 3, via the communication unit 21 to the server 30 in real time. In accordance with an instruction (control signal) received from the server 30, the main control unit 10 also controls a display control unit (image processing unit) so as to carry out image processing for adding a specified lighting effect to the picked-up images.

Image Pickup Unit

The image pickup unit 3 includes a lens system composed of the image pickup lens 3a shown in FIG. 1, an aperture, a zoom lens, a focus lens, and the like, a driving system that has the lens system carry out focus operations and zoom operations, and a solid-state image pickup element array that photoelectrically converts picked-up light obtained by the lens system to generate a picked-up image signal. As examples, the solid-state image pickup element array may be realized by a CCD (Charge Coupled Device) sensor array or a CMOS (Complementary Metal Oxide Semiconductor) sensor array.

Image Pickup Control Unit

The image pickup control unit 11 controls the operation of the image pickup unit 3 and the image pickup signal processing unit 12 based on instructions from the main control unit 10. As one example, the image pickup control unit 11 carries out on/off control of operation of the image pickup unit 3 and the image pickup signal processing unit 12. It is also assumed that the image pickup control unit 11 carries out control (motor control) of the image pickup unit 3 so as to carry out operations such as autofocus, automatic exposure adjustment, aperture adjustment, and zooming. The image pickup control unit 11 includes a timing generator and controls signal processing operations by the solid-state image pickup elements and a sample-hold/AGC circuit and video A/D convertor of the image pickup signal processing unit 12 using the timing signal generated by the timing generator. It is also assumed that it is possible to variably control the image pickup frame rate via such timing control.

In addition, the image pickup control unit 11 carries out control of the image pickup sensitivity and signal processing of the solid state image pickup elements and the image pickup signal processing unit 12. As examples, it is possible to carry out gain control of the signal read from the solid state image pickup elements as control of the image pickup sensitivity, and to carry out black level setting control, control of various coefficients in picked-up image signal processing at a digital data stage, and control over correction amounts used in vibration correction processing.

Image Pickup Signal Processing Unit

The image pickup signal processing unit 12 includes a sample-hold/AGC (Automatic Gain Control) circuit that carries out gain adjustment and waveform shaping on the signal obtained by the solid state image pickup elements of the image pickup unit 3 and a video A/D (analog/digital) convertor. By doing so, the image pickup signal processing unit 12 obtains an image pickup signal as digital data. The image pickup signal processing unit 12 also carries out white balance processing, luminance processing, color signal processing, vibration correction processing and the like on the image pickup signal.

Picked-Up Image Analyzing Unit

The picked-up image analyzing unit 13 is one example of a configuration for acquiring ambient information. More specifically, the picked-up image analyzing unit 13 analyzes image data (picked-up images) that has been picked up by the image pickup unit 3 and processed by the image pickup signal processing unit 12 to obtain information on the images included in the image data. As specific examples, the picked-up image analyzing unit 13 carries out analysis such as point detection, line/edge detection, and segmentation of the image data and outputs an analysis result to the main control unit 10.

Lighting Unit, Lighting Control Unit

The lighting unit 4 is composed of the light emitting unit 4a shown in FIG. 1 and a light emitting circuit that causes the light emitting unit 4a to emit light. The lighting control unit 14 has the lighting unit 4 carry out light emitting operations in accordance with control by the main control unit 10. By attaching the light emitting unit 4a of the lighting unit 4 so as to emit light forward as shown in FIG. 1, it is possible for the lighting unit 4 to carry out a light emitting operation in the direction in which the user is looking.

Audio Input Unit, Audio Signal Processing Unit

The audio input unit 6 includes the microphones 6a, 6b shown in FIG. 1, a microphone amplifier unit that carries out amplification processing of an audio signal obtained by the microphones 6a, 6b, an A/D converter, and the like, and outputs audio data to the audio signal processing unit 15. The audio signal processing unit 15 carries out processing, such as noise reduction and sound source separation, on the audio data obtained by the audio input unit 6. The processed audio data is then supplied to the main control unit 10. By including the audio input unit 6 and the audio signal processing unit 15, the HMD 1 according to the present embodiment makes it possible for the user to input audio and the like.

Display Control Unit

The display control unit 17 functions as an image processing unit that processes specified image data to be displayed on the display units 2 in accordance with control by the main control unit 10. As a specific example, the display control unit 17 includes a video processor, a digital signal processor, a D/A convertor and the like and carries out generation of display image data, brightness level adjustment of the generated display image data, color correction, contrast adjustment, sharpness (edge enhancement) adjustment, and the like.

The display control unit 17 also functions as a driving control unit that controls the displaying of specified image data on the display units 2 in accordance with control by the main control unit 10. More specifically, the display control unit 17 includes a pixel driving circuit for displaying image data on the display units 2 which are liquid crystal displays for example. The display control unit 17 (driving control unit) is also capable of controlling the transmissivity of the respective pixels of the display units 2 and putting the display units 2 in the pass-through state (a transparent or semi-transparent state) or a non-pass-through (or opaque) state.

The display control unit 17 (image processing unit) according to the present embodiment carries out image processing that adds a specified lighting effect to food and drink that has been picked up in accordance with control by the main control unit 10. The specified lighting effect referred to here is an incandescent lighting effect where reds and yellows are emphasized by a gentle coloring (orange color) and where shadows tend to be produced due to point lighting, just like when lighting with incandescent lighting or a fluorescent lighting effect that has a uniform overall brightness with whitish light and is unlikely to produce shadows due to surface lighting, just like when lighting with fluorescent lighting. By displaying images to which the display control unit 17 has added a specified lighting effect on the display units 2, it is possible to make cooking appear much more delicious and stimulate the appetite, or to make cooking appear not delicious and suppress the appetite.

Display Units

The display units 2 are realized by liquid crystal displays, for example, and as shown in FIG. 1, in a state where the HMD 1 is mounted on the user 8, a pair of display units 2 for the left eye and the right eye are disposed at locations immediately in front of both eyes of the user 8, or in other words where lenses of ordinary eyeglasses would be disposed. The display units 2 may be placed in the pass-through state or the non-pass-through state by control by the display control unit 17. As one example, when the display units 2 have been placed in the non-pass-through state, images produced by the display control unit 17 carrying out image processing on picked-up images produced by picking up images of the cooking S1 to S3 using the image pickup lens 3a to add a specified lighting effect are displayed on the display units 2.

Audio Control Unit

The audio control unit 18 carries out generation of audio signal data, volume adjustment of the generated audio signal data, audio quality adjustment, and the addition of audio effects in accordance with control by the main control unit 10. The audio control unit 18 carries out control so that specified audio signal data is outputted from the audio output unit 5 in accordance with control by the main control unit 10.

Audio Output Unit

The audio output unit 5 includes the pair of earphone speakers 5a shown in FIG. 1 and an amplifier circuit for the earphone speakers 5a. The audio output unit 5 may be configured as a so-called bone conduction speaker. The audio output unit 5 outputs (reproduces) audio signal data in accordance with control by the audio control unit 18.

Projection Control Unit

The projection control unit 19 processes specified image data to be projected from the projecting unit 7 in accordance with control by the main control unit 10. The projection control unit 19 also functions as a driving control unit that carries out control in accordance with control by the main control unit 10 so that specified image data is projected from the projecting unit 7.

Projecting Unit

The projecting unit 7 has an optical system such as the projection lens 7a shown in FIG. 1, a liquid crystal panel, a condenser lens, and a light source. Light emitted from the light source is outputted via the condenser lens, the liquid crystal panel, and the projection lens 7a so as to project images in front of the HMD 1. It is also possible for the projecting unit 7 to project using projection mapping (PM) technology.

Here, the liquid crystal panel modulates the incident light (i.e., realizes a function as a light modulation unit for forming images in accordance with an image signal) and outputs to the projection lens 7a. The liquid crystal panel is driven by the projection control unit 19 described above so as to form specified image data. The condenser lens and the projection lens 7a are driven by the projection control unit 19 described above to carry out adjustment of the luminance of the projected images, the projection direction, the focus, and the like.

Storage Unit

The storage unit 22 is an element that carries out recording and reproduction of data on a specified recording medium. The storage unit 22 is realized by an HDD (Hard Disc Drive), for example. It should be obvious that various types are conceivable as the recording medium, such as fixed memory like a flash memory, a memory card in which a flash memory is incorporated, an optical disc, a magneto-optical disc, and a hologram memory, with the storage unit 22 being configured so as to be capable of recording and reproduction in accordance with the specific recording medium in use.

Communication Unit

The communication unit 21 carries out transmission and reception of data to and from an external appliance. The communication unit 21 carries out wireless communication directly with the external appliance or via a network access point using a method such as wireless LAN (Local Area Network), Wi-Fi (Wireless Fidelity, registered trademark), infrared communication, and Bluetooth (registered trademark).

As one example, the communication unit 21 carries out wireless communication with the server 30 shown in FIG. 1.

This completes the detailed description of the internal configuration of the HMD 1 according to the present embodiment. Note that although the audio output unit 5, the audio input unit 6, the audio signal processing unit 15, and the audio control unit 18 have been given as the configuration of an audio system, it is not necessary to provide all of such elements.

2-2. Fundamental Configuration of Server

Figure 3:
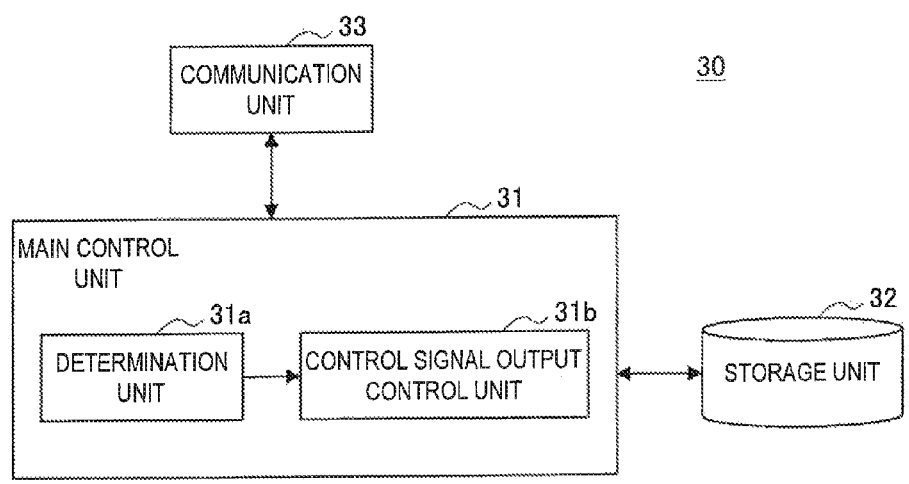
FIG. 3 is a block diagram showing one example of the internal configuration of a server according to the present embodiment.

Next, the configuration of the server 30 included in the lighting system according to the present embodiment will be described with reference to FIG. 3. FIG. 3 is a block diagram showing an example of the internal configuration of the server 30 according to the present embodiment.

As shown in FIG. 3, the server 30 includes a main control unit 31, a storage unit 32, and a communication unit 33.

Main Control Unit

As one example, the main control unit 31 is composed of a microcomputer including a CPU, a ROM, a RAM, non-volatile memory, and an interface unit and controls the various structural elements of the server 30.

As shown in FIG. 3, the main control unit 31 according to the present embodiment functions as a determination unit 31a and a control signal output control unit 31b.

The determination unit 31a determines, based on the picked-up images transmitted from the HMD 1, whether the user is consuming food and drink or whether food and drink is present in the periphery of the user. As one example, the determination unit 31a is capable of analyzing the picked-up images and determining that food and drink is present in the periphery of the user if food and drink (cooking) is included in the picked-up images and determining that the user is consuming food and drink (i.e., is mid-meal) if food is being carried to the mouth using a fork, spoon, or the like. As one example, a typical image analyzing method is used as the method of analyzing the picked-up images. More specifically, the determination unit 31a first carries out analysis such as point detection, line/edge detection, and segmentation on the picked-up images and extracts feature data or local feature data on the form, size, color and the like of the subject. Next, the determination unit 31a compares feature data or local feature data of actual objects (cooking) that are registered in a model database stored in the storage unit 32 or the like with the extracted feature data or local feature data and analyzes what the subjects are in accordance with the degree of similarity.

In this way, the determination unit 31a determines whether the user is consuming food and drink (i.e., is mid-meal) or whether food and drink is present in the periphery of the user and supplies the determination result to the control signal output control unit 31b.

The control signal output control unit 31b carries out control in accordance with the determination result of the determination unit 31a so as to output a control signal to an adding unit that adds a lighting effect to the food and drink present in the real space or to picked-up images of the food and drink. In the present specification, such adding unit is realized for example by the lighting apparatus 40 (including the incandescent lighting units 41 and the fluorescent lighting units 42), the lighting unit 4 of the HMD 1, the projecting unit 7 (including the projection lens 7a) or the display control unit 17 (the image processing unit). Note that if the lighting effect is added by the lighting apparatus 40, the lighting unit 4 or the projecting unit 7, the HMD 1 may be configured so as to not include the display units 2.

As one example, if the user is mid-meal or food and drink is present in the periphery of the user, the control signal output control unit 31b according to the present embodiment transmits a control signal via the communication unit 33 to the adding unit so as to have an incandescent lighting effect added to the food and drink. By doing so, it is possible to make the cooking appear much more delicious and to stimulate the appetite of the user 8.

More specifically, the control signal output control unit 31b transmits a signal for control that turns on the incandescent lighting units 41 of the lighting apparatus 40 via the communication unit 33 to the lighting apparatus 40 (one example of the adding unit). Alternatively, if the lighting unit 4 provided in the HMD 1 is capable of incandescent lighting, the control signal output control unit 31b transmits a control signal that turns on such incandescent lighting via the communication unit 33 to the HMD 1.

Alternatively the control signal output control unit 31b transmits a signal that controls the projecting unit 7 so as to project an image for adding the incandescent lighting effect onto the cooking via the communication unit 33 to the HMD 1. Examples of the image for adding the incandescent lighting effect include a colored light image that reproduces the color of incandescent lighting, a complementary color image that adds emphasis to the color with reds and yellows of the cooking as complementary colors, and a shadow image that reproduces shadows produced by point lighting.

Alternatively, the control signal output control unit 31b transmits a control signal, which has an image processing unit (for example, the display control unit 17) carry out image processing for adding the incandescent lighting effect to the picked-up images produced by image pickup of food and drink, via the communication unit 33 to the HMD 1.

In this way, the control signal output control unit 31b transmits a control signal for adding the incandescent lighting effect to food and drink or to picked-up images of the food and drink via the communication unit 33 to the respective adding units.

Note that if the user is mid-meal or food and drink is present in the periphery of the user and the dining mode that has been set is a mode intended to reduce the appetite, the control signal output control unit 31b according to the present embodiment is capable of transmitting a control signal for adding a fluorescent lighting effect to the adding unit. By doing so, it is possible to make the cooking appear not delicious and cause a reduction in the appetite of the user 8.

Figure 4:
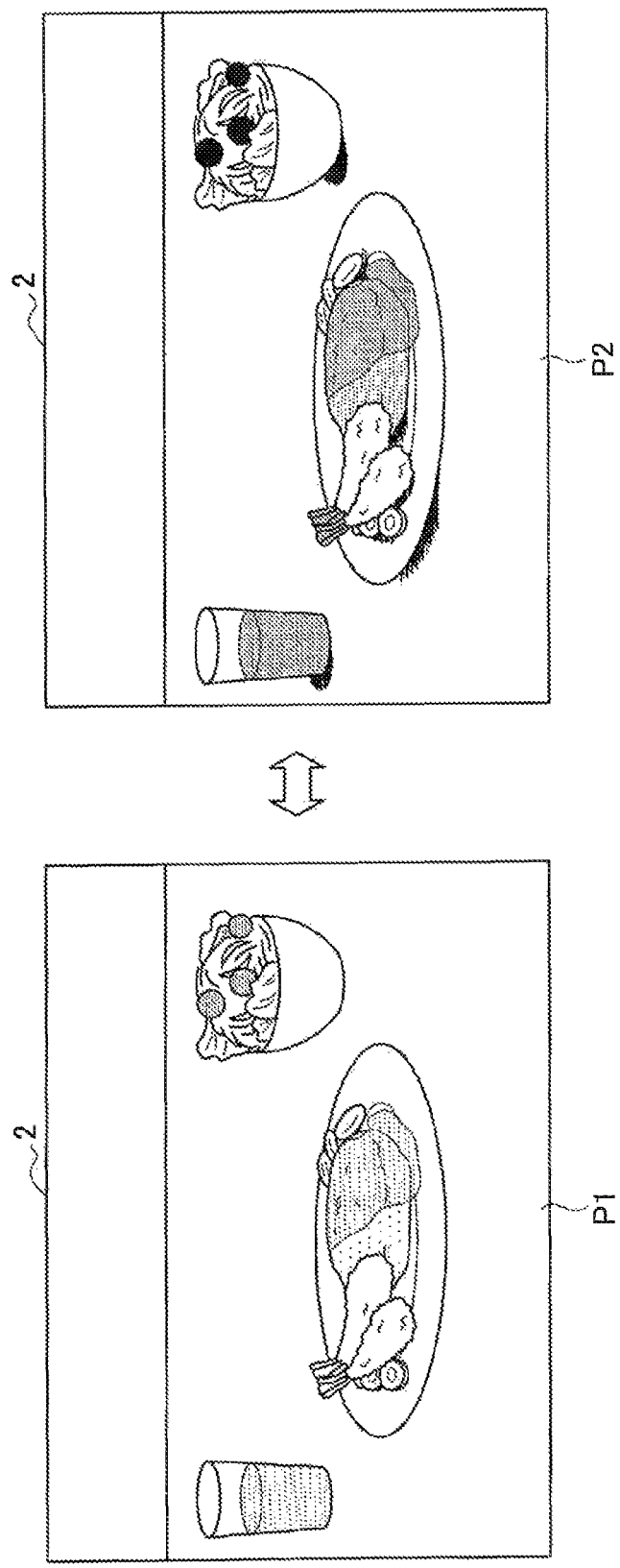
FIG. 4 is a diagram useful in explaining the difference in appearance of cooking between a case where a fluorescent lighting effect is added and a case where an incandescent lighting effect is added.

Here, a case where the fluorescent lighting effect has been added and a case where the fluorescent lighting effect has been added will be described with reference to FIG. 4. FIG. 4 is a diagram useful in explaining the difference in the appearance of cooking between a case where the fluorescent lighting effect has been added and a case where the incandescent lighting effect has been added. In the example shown in FIG. 4, a case is imagined where the display units 2 of the HMD 1 display images P1, P2 produced by the display control unit 17 (image processing unit) carrying out image processing which adds the fluorescent/incandescent lighting effects to picked-up images produced by image pickup of food and drink in accordance with control signals outputted from the control signal output control unit 31b.

More specifically, in the image P1 shown in FIG. 4, the fluorescent lighting effect is added to the picked-up images produced by image pickup of food and drink by image processing that makes the images appear to have a uniform overall brightness with a whitish hue like daytime sunlight and have no shadows, resulting in a flat appearance. By doing so, there is a reduction in the visual deliciousness of the food and drink, which reduces the appetite of the user 8. In the present embodiment, adding of the fluorescent lighting effect is carried out in particular when the dining mode is set at an appetite suppressing ("diet") mode.

Meanwhile, in the image P2 shown in FIG. 4, the incandescent lighting effect is added to the picked-up images produced by image pickup of food and drink by image processing that emphasizes reds and yellows using gentle coloring (orange color) just like when lighting with incandescent lighting and adds shadows to the cooking or the dishes on which the cooking is arranged, giving a three-dimensional appearance. By doing so, there is an increase in the visual deliciousness of the food and drink, which stimulates the appetite of the user 8. In the present embodiment, adding of the incandescent lighting effect is carried out in particular when the dining mode is set at a mode that makes food appear more delicious.

This completes the detailed description of the addition of a fluorescent/incandescent lighting effect in accordance with a control signal outputted from the control signal output control unit 31b.

Note that the control signal output control unit 31b according to the present embodiment is capable of also outputting, to the adding unit, a control signal indicating that images for positively or negatively presenting the state of food and drink are to be added to the food and drink or the picked-up images of the food and drink via projection by the projecting unit 7 or image processing by the image processing unit.

One example of images for positively presenting the state of food and drink are images that give an impression of deliciousness by making the ingredients look fresh and juicy and/or stimulate the appetite by making the food appear sizzling. Specific examples include images of charring and dripping juices for the case of cooked meat, steam rising from cooking in the case of hot cooking (which is assumed here to include hot drinks), cold air and drops of condensation on the surface in the case of cold cooking (which is assumed here to include cold drinks), and water drops on the surface and juice droplets present at cut surfaces for the case of fruit and vegetables.

Figure 5:
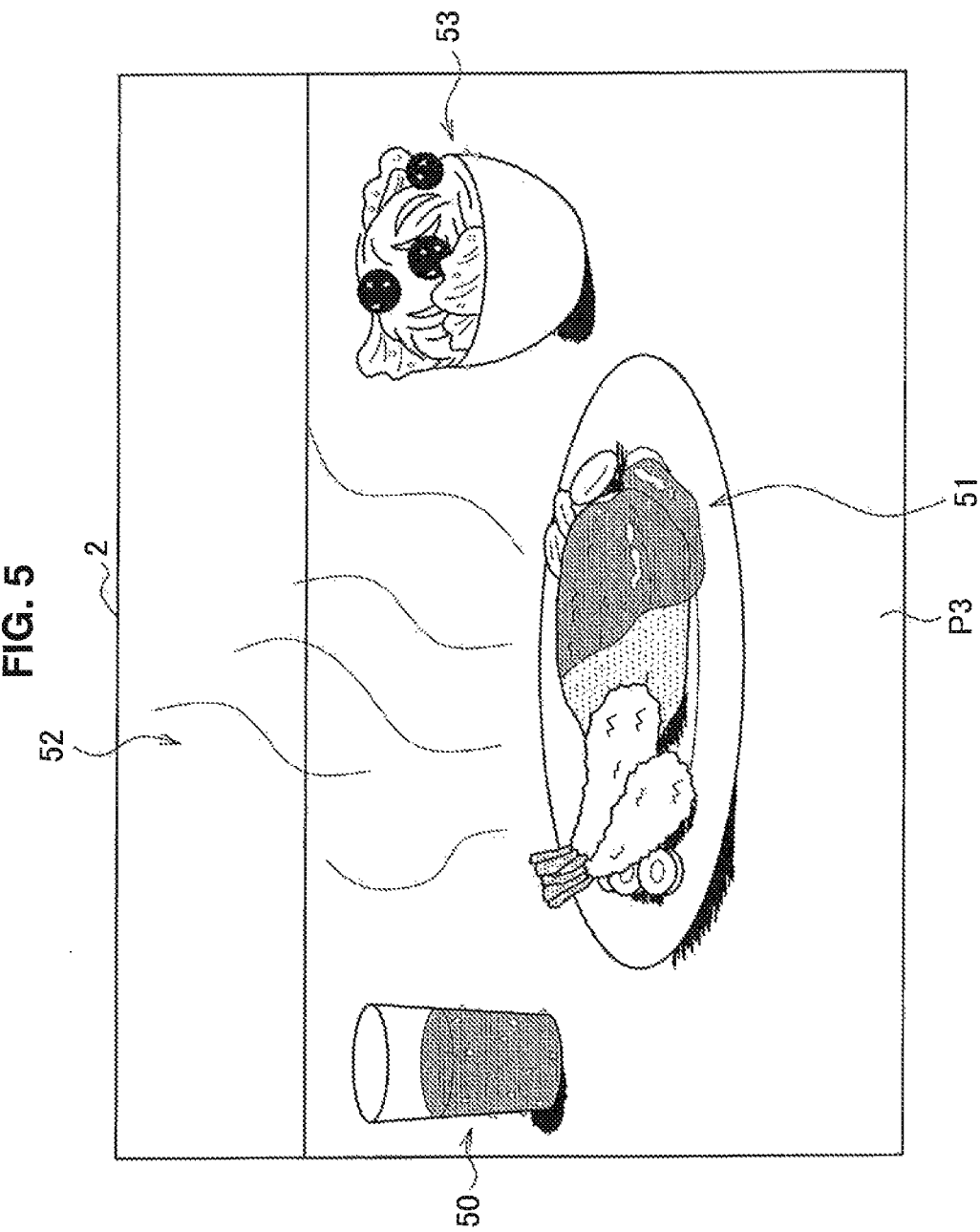
FIG. 5 is a diagram showing one example of a case where an incandescent lighting effect and images for positively presenting the state of food and drink have been added to food and drink.

Here, a case where images are added to positively present the state of food and drink will be described with reference to FIG. 5. FIG. 5 is a diagram showing an example of a case where the incandescent lighting effect and images for positively presenting the state of food and drink have both been added to food and drink. In the example shown in FIG. 5, a case is imagined where an image P3, which has been produced by the display control unit 17 (image processing unit) adding, images for positively presenting the state of food and drink to picked-up images produced by image pickup of food and drink in accordance with a control signal from the control signal output control unit 31b, is displayed on the display units 2 of the HMD 1.

As shown in FIG. 5, water droplet images 50, 53, a meat juices image 51 that emphasizes sheen, and a steam image 52 are added in accordance with the food and drink items as the images for positively presenting the state of food and drink. Note that the decision as to what kind of images are added to what food and drink items is taken in accordance with a control signal outputted from the control signal output control unit 31b.

An image for positively presenting the state of food and drink may also be directly projected onto the food and drink in the real space by the projecting unit 7. When doing so, the projecting unit 7 may project an image using PM (projection mapping) technology, for example.

In addition, the positive or negative visual impression of food and drink (cooking) is also influenced by the color and/or pattern of dishes on which the food and drink is arranged, the color and/or pattern of the table (or luncheon mat) on which the food and drink is placed, and the like. As one example, it is known that warm colors, colors that complement the color of food and drink (cooking), similar colors, and related colors make cooking appear much more delicious. Meanwhile, cold colors make cooking look less delicious, while patterns such as spots, stars and wavy lines provide a strong visual stimulus, resulting in a phenomenon where the eyes are irritated.

For this reason, it is also conceivable for the display control unit 17 (image processing unit) or the projecting unit 7 according to the present embodiment to change the color or design of the dishes and/or table to positively or negatively present the state of the food and drink (cooking) and thereby stimulate or suppress the appetite of the user 8. A specific example will now be described with reference to FIG. 6.

Figure 6:
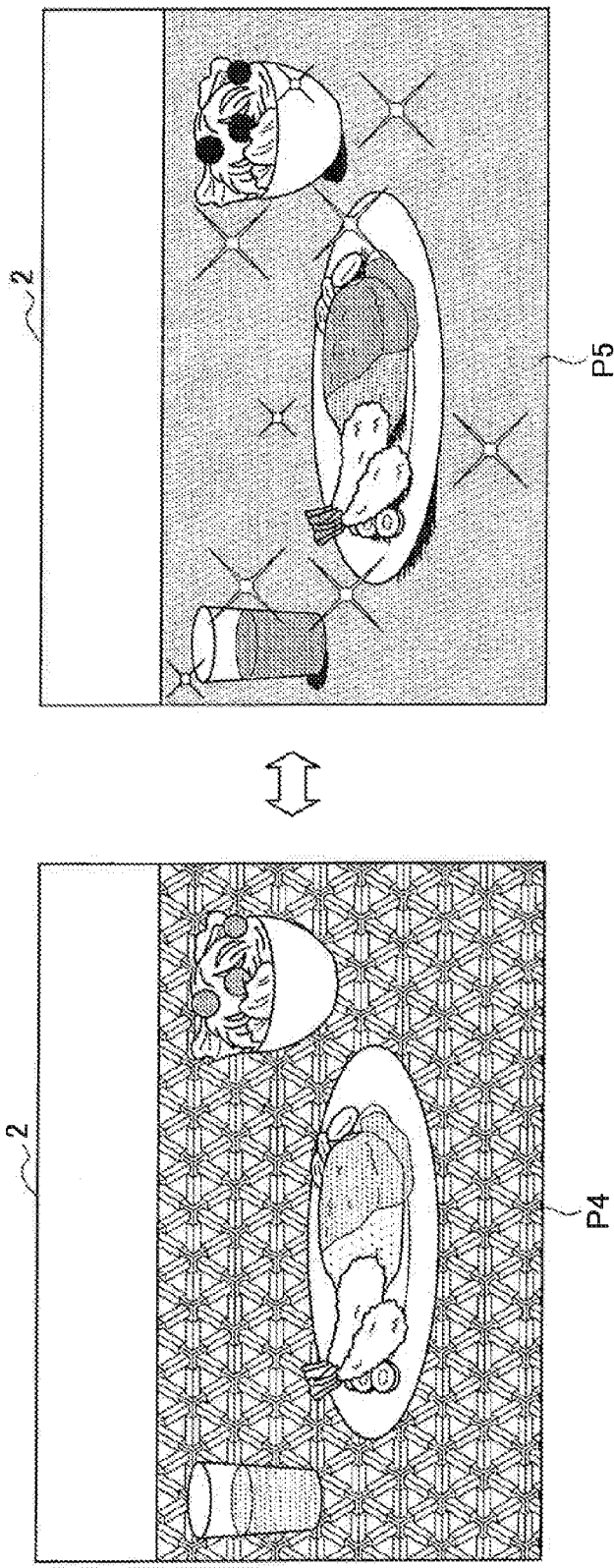
FIG. 6 is a diagram showing one example of a case where images for positively or negatively presenting the state of food and drink have been added to dishes and a table.

FIG. 6 is a diagram showing an example of a case where images for positively or negatively presenting the state of food and drink have been added to the dishes and/or table. In the example shown in FIG. 6, a case is imagined where images P4, P5, which have been produced by the display control unit 17 (image processing unit) carrying out image processing on picked-up images produced by image pickup of food and drink to positively or negatively present the state of the food and drink in accordance with a control signal outputted from the control signal output control unit 31, are displayed on the display units 2 of the HMD 1.

More specifically, as shown in image P4 in FIG. 6, by changing the pattern of the table on which the food and drink is placed in the picked-up images to a pattern that gives a strong visual impression and causes a phenomenon where the eyes are irritated, it is possible to make the state of the food and drink appear worse and to reduce the appetite.

Meanwhile, as shown in image P5 in FIG. 6, by carrying out image processing that changes the color of the table on which the food and drink is placed in the picked-up images to a warm color, for example, and making the dishes shiny to produce a luster, it is possible to make the state of the food and drink appear better and to stimulate the appetite.

Note that the decision of how to change the color, patterns, and the like of dishes and the table is taken in accordance with a control signal outputted from the control signal output control unit 31*b* of the server 30.

Such images (color images, pattern images, and the like) for positively or negatively presenting the state of food and drink may be directly projected by the projecting unit 7 onto the dishes and/or the table in the real space. When doing so, the projecting unit 7 may project an image using PM (projection mapping) technology, for example.

As described above, the control signal output control unit 31*b* of the server 30 according to the present embodiment outputs a control signal for adding a fluorescent/incandescent lighting effect to food and drink or to picked-up images of the food and drink to the HMD 1 or the lighting apparatus 40. In addition, the control signal output control unit 31*b* outputs a control signal for adding images for positively or negatively presenting the state of food and drink to the food and drink or to picked-up images of the food and drink to the HMD 1.

Storage Unit

The storage unit 32 is an element that carries out recording and reproduction of data on a specified recording medium. The storage unit 32 is realized by an HDD, for example. It should be obvious that various devices are conceivable as the recording medium, such as a fixed memory like a flash memory, a memory card in which a fixed memory is incorporated, an optical disc, a magneto-optical disc, and a hologram memory, with the storage unit 32 being configured so as to be capable of recording and reproduction in accordance with the specific recording medium in use.

The storage unit 32 according to the present embodiment also stores a model database used by the determination unit 31*a* when recognizing subjects from the picked-up images, image information for generating the images for positively or negatively presenting the state of food and drink, and the like.

Communication Unit

The communication unit 33 carries out transmission and reception of data to and from an external appliance. The communication unit 33 carries out wireless communication directly with the external appliance or via a network access point using a method such as a wireless LAN (Local Area Network).

As one example, the communication unit 33 carries out wireless communication with at least one HMD 1 and receives the picked-up images that have been picked up by the image pickup unit 3 provided on an HMD 1 mounted on a user. The communication unit 33 also transmits a control signal to the HMD 1 or the lighting apparatus 40 in accordance with control by the control signal output control unit 31*b*.

3. Operation Processing

This completes the specific description of the fundamental configuration of the HMD 1 and the server 30 included in the lighting system according to the present embodiment. Next, the operation processing of the lighting system according to the present embodiment will be described in detail with reference to FIG. 7 to FIG. 12.

3-1. First Lighting Control

Figure 7:
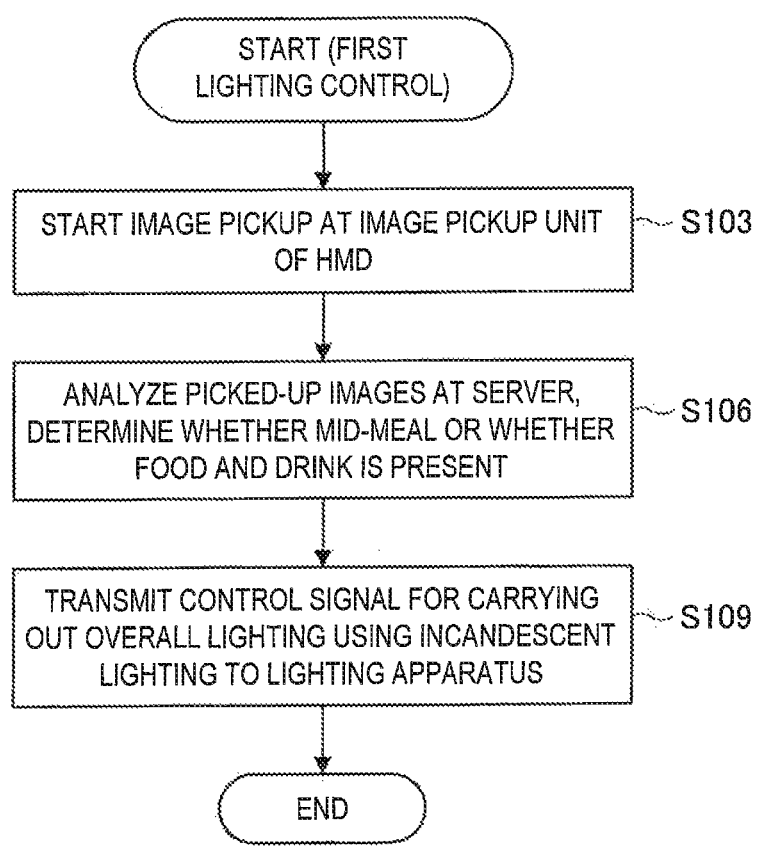
FIG. 7 is a flowchart showing processing of first lighting control according to the present embodiment.

FIG. 7 is a flowchart showing the processing of lighting control according to the present embodiment. As shown in FIG. 7, in step S103, the HMD 1 first starts image pickup by the image pickup unit 3. The trigger for the start of image pickup may be an image pickup instruction given by the user or may be meal time zones that are set in advance. The HMD 1 transmits the picked-up images that have been picked up to the server 30.

Next, in step S106, the determination unit 31*a* of the server 30 analyzes the picked-up images transmitted from the HMD 1 and determines whether the user is mid-meal or whether food and drink is present. The determination unit 31*a* supplies the determination result to the control signal output control unit 31*b*.

Next, in step S109, if the determination unit 31*a* has determined that the user is mid-meal or that food and drink is present, the control signal output control unit 31*b* of the server 30 carries out control to transmit a control signal for carrying out overall lighting using incandescent lighting to the lighting apparatus 40.

By doing so, when the user 8 is having a meal, lighting with incandescent lighting is automatically carried out by the incandescent lighting units 41 of the lighting apparatus 40, which makes the cooking appear much more delicious. Note that after the meal ends or if food and drink is no longer present, by transmitting a control signal for carrying out overall lighting using fluorescent lighting to the lighting apparatus 40, the control signal output control unit 31*b* of the server 30 has lighting with fluorescent lighting automatically carried out to produce appropriate lighting for tidying up after the meal and other tasks.

3-2. Second Lighting Control

Figure 8:
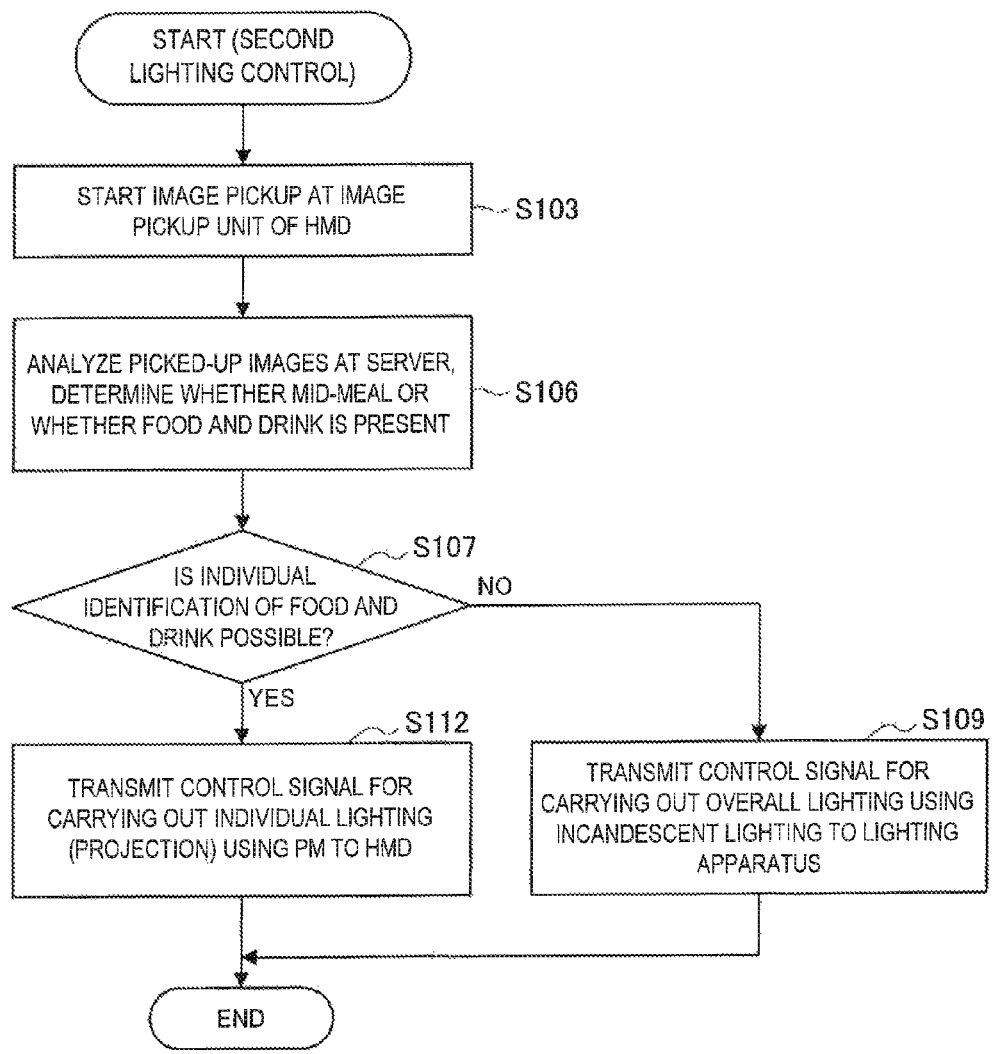
FIG. 8 is a flowchart showing processing of second lighting control according to the present embodiment.

FIG. 8 is a flowchart showing processing of second lighting control according to the present embodiment. As shown in FIG. 8, since steps S103 and S106 are the same as the processing in the same steps shown in FIG. 7, description thereof is omitted here.

Next, in step S107, if the user 8 is mid-meal or food and drink is present, the determination unit 31*a* further determines whether it is possible to individually identify the types of food and drink (for example, the type of cooked dish on each plate). For example, in the example shown in FIG. 1, it is determined whether it is possible to individually identify the types by image analysis of the cooking S1 to S3. More specifically, if only one cooked dish appears in the picked-up images or it is not possible to identify the types of a plurality of cooked dishes that appear, the determination unit 31*a* determines that individual identification is not possible. The determination unit 31*a* supplies the determination result to the control signal output control unit 31*b*.

Next, if it has been determined that individual identification is not possible (S107/No), in step S109, the same processing as the same step shown in FIG. 7 is carried out. That is, the control signal output control unit 31*b* of the server 30 carries out control to transmit a control signal for carrying out overall lighting using incandescent lighting on the food and drink to the lighting apparatus 40.

By doing so, when the user 8 is having a meal, lighting with incandescent lighting is automatically carried out by the incandescent lighting units 41 of the lighting apparatus 40, which makes the cooking appear much more delicious. Note that after the meal ends or if food and drink is no longer present, by transmitting a control signal for carrying out overall lighting using fluorescent lighting to the lighting apparatus 40, the control signal output control unit 31*b* of the server 30 has lighting with fluorescent lighting automatically carried out to produce appropriate lighting for tidying up after the meal and other tasks.

Meanwhile, if it has been determined that individual identification is possible (S107/Yes), in step S112, the control signal output control unit 31*b* of the server 30 carries out control to transmit, to the HMD 1, a control signal for individual lighting in accordance with the types of the respective cooked dishes identified by the determination unit 31*a*. As one example, individual lighting is carried out using projection mapping by the projecting unit 7 of the HMD 1. In this case, the control signal output control unit 31*b* generates a control signal for lighting (projecting) that adds an incandescent lighting effect that makes cooking appear much more delicious to cooking recognized as being healthy and adds a fluorescent lighting effect that makes dishes less delicious to dishes recognized as being unhealthy in accordance with the types of the cooked dishes, and transmits the control signal to the HMD 1.

In this way, according to the second lighting control (projection control), when the determination unit 31*a* has been able to individually identify the respective cooked dishes, it is possible to add a different lighting effects to each cooked dish, which improves the usability of the lighting system.

3-3. Image Processing

This completes the description of operation processing when adding an incandescent/fluorescent lighting effect to food and drink according to lighting control by the lighting apparatus 40 or projection control by the projecting unit 7 of the HMD 1. Next, operation processing when adding an incandescent/fluorescent lighting effect to food and drink using the display control unit 17 (image processing unit) of the HMD 1 will be described.

Figure 9:
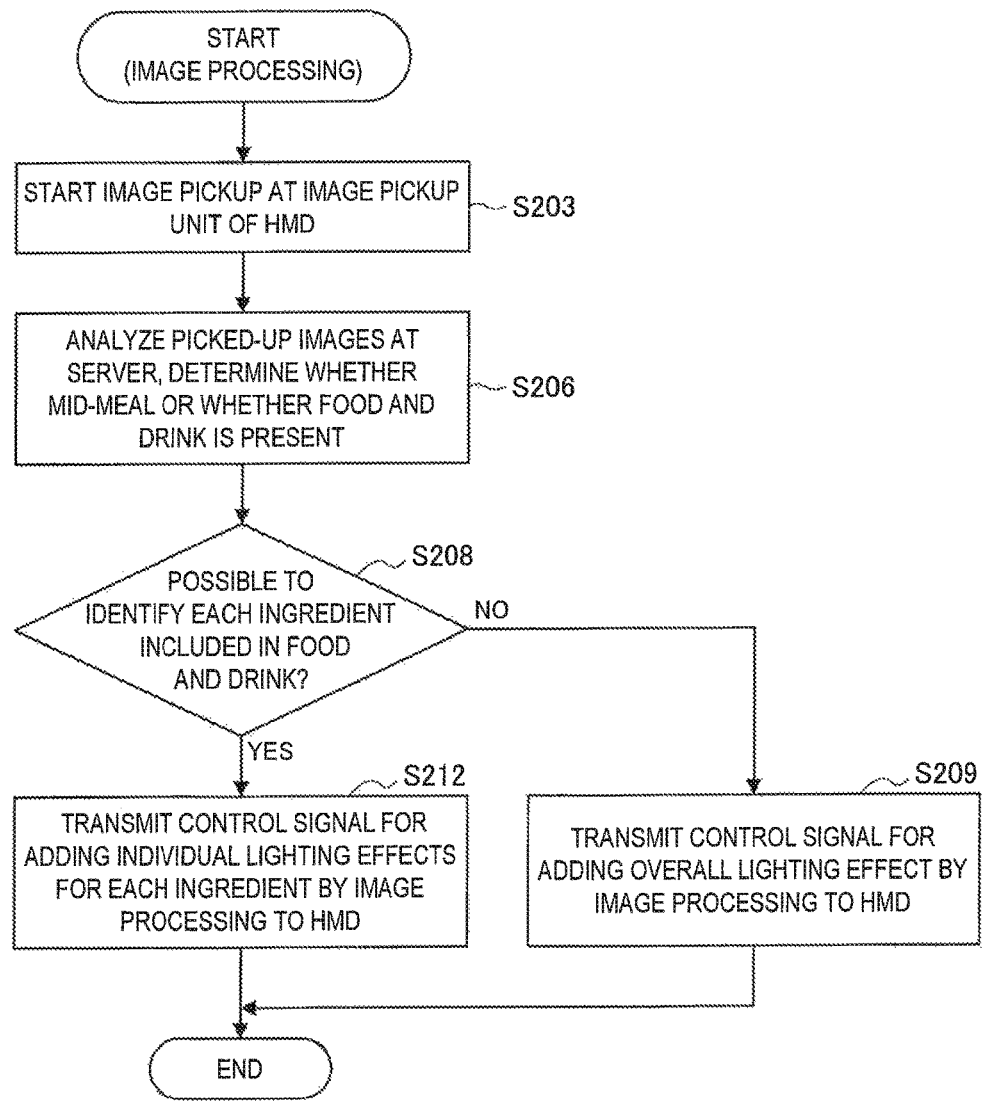
FIG. 9 is a flowchart showing processing in a case where an incandescent/fluorescent lighting effect according to the present embodiment is added by image processing.

FIG. 9 is a flowchart showing the processing when adding the incandescent/fluorescent lighting effect according to the present embodiment by image processing. As shown in FIG. 9, in step S203, first, the HMD 1 starts image pickup by the image pickup unit 3. The HMD 1 transmits the picked-up images that have been picked up to the server 30.

Next, in step S206, the determination unit 31*a* of the server 30 analyzes the picked-up images transmitted from the HMD 1 and determines whether the user is mid-meal or whether food and drink is present. The determination unit 31*a* supplies the determination result to the control signal output control unit 31*b*.

Next, in step S208, if the user 8 is mid-meal or food and drink is present, the determination unit 31*a* further determines whether it is possible to individually identify the types of ingredients included in the food and drink (for example, the types of ingredients on the respective plates). For example, in the example shown in FIG. 1, since a plurality of vegetables are included in the cooked dish S1 (a salad) and two types of ingredients, a hamburger and fried prawns, are included in the cooked dish S2 (an entree), the determination unit 31*a* determines that individual identification is possible according to image analysis. More specifically, the determination unit 31*a* determines that individual identification is not possible if, like the cooked dish S3 (a drink) shown in FIG. 1, only one cooked dish including a single ingredient appears in the picked-up images or if it is not possible to identify the types of a plurality of ingredients included in a cooked dish. The determination unit 31*a* supplies the determination result to the control signal output control unit 31*b*.

Next, if it has been determined that it is not possible to identify each ingredient (S208/No), in step S209, the control signal output control unit 31*b* of the server 30 carries out control to generate a control signal to add an overall lighting effect using the incandescent lighting effect via image processing and transmits the control signal to the HMD 1.

By doing so, if the user 8 is having a meal, images that have been subjected to image processing to automatically add an incandescent lighting effect to the entire image (to all of the dishes appearing in the picked-up images) using the display control unit 17 (image processing unit) of the HMD 1 are displayed on the display units 2, which makes the cooking appear much more delicious.

Meanwhile, if it has been determined that it is possible to identify each ingredient (S208/Yes), in step S212, the control signal output control unit 31*b* of the server 30 carries out control to transmit a control signal for carrying out image processing to individually add specified lighting effects in accordance with the types of ingredients included in each cooked dish to the HMD 1. In this case, in accordance with the types of ingredients included in the respective cooked dishes, the control signal output control unit 31*b* generates a control signal that adds an incandescent lighting effect that makes ingredients appear much more delicious to ingredients generally recognized as being healthy and adds a fluorescent lighting effect that makes ingredients appear less delicious to ingredients generally recognized as being unhealthy and transmits the control signal to the HMD 1.

In this way, according to image processing, when the determination unit 31*a* has been able to individually identify the types of ingredients included in the respective cooked dishes, it is possible to add different lighting effects to each ingredient included in the cooked dishes, which improves the usability of the lighting system.

3-4. Combined Type

This completes the description of the operation processing when adding an incandescent/fluorescent lighting effect using the lighting apparatus 40, the projecting unit 7 of the HMD 1, or the display control unit 17 (image processing unit) of the HMD 1 in the lighting system according to the present embodiment. Accordingly, the lighting system according to the present embodiment can be realized by a configuration including at least one of the lighting apparatus 40, the projecting unit 7 of the HMD 1, and the display control unit 17 (image processing unit) of the HMD 1 as an adding unit.

The lighting system according to the present embodiment may also have a configuration including at least two out of the lighting apparatus 40, the projecting unit 7 of the HMD 1, and the display control unit 17 (image processing unit) of the HMD 1 as adding units. In this case, the lighting system according to the present embodiment carries out combined-type operation processing that outputs control signals to the appropriate adding units as necessary. Combined-type operation processing will now be described with reference to FIG. 10.

Figure 10:
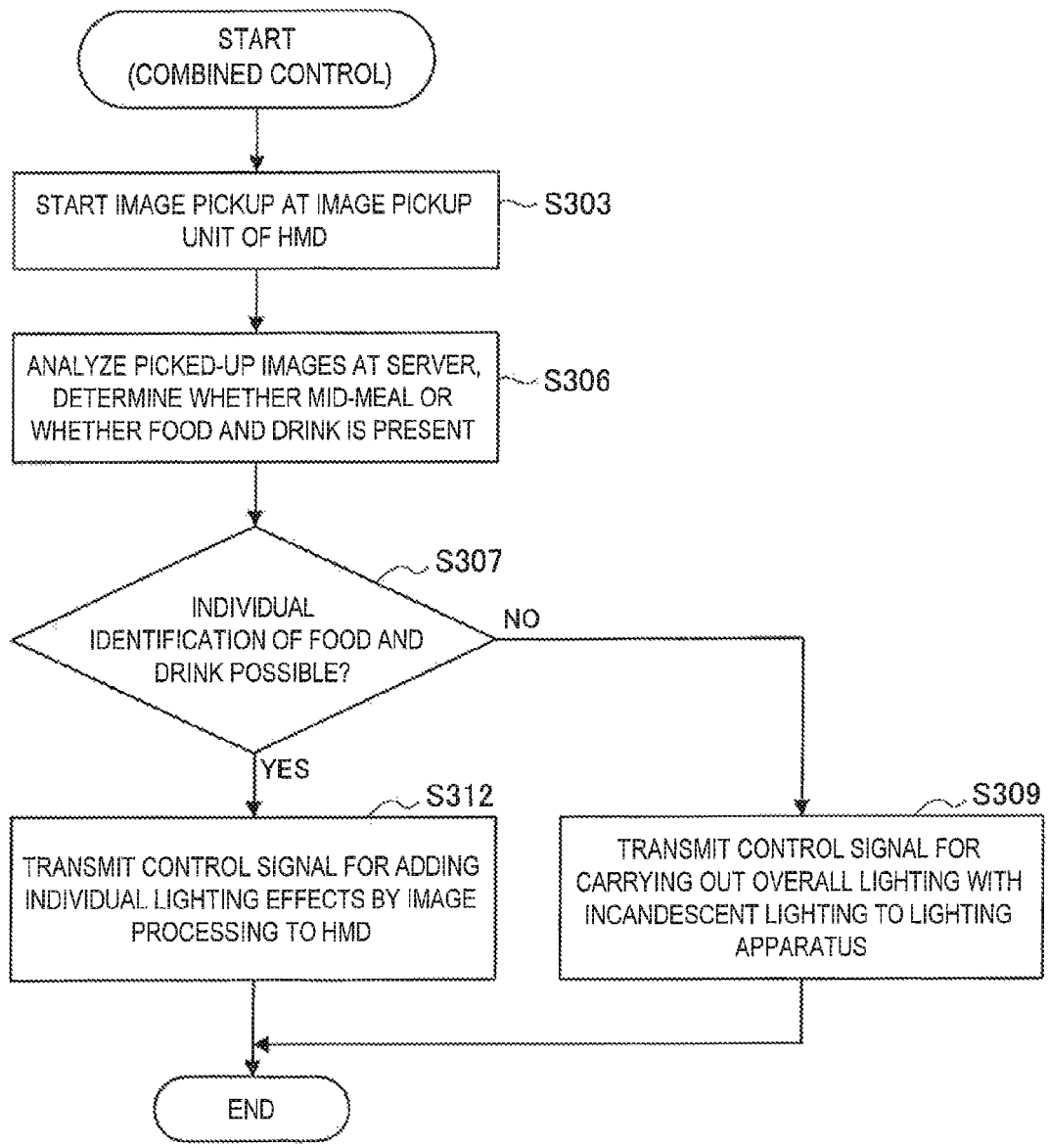
FIG. 10 is a flowchart showing combined-type operation processing according to the present embodiment.

FIG. 10 is a flowchart showing combined-type operation processing according to the present embodiment. As shown in FIG. 10, in step S303, first the HMD 1 starts image pickup by the image pickup unit 3. The HMD 1 transmits the picked-up images that have been picked up to the server 30.

Next, in step S306, the determination unit 31*a* of the server 30 analyzes the picked-up images transmitted from the HMD 1 and determines whether the user is mid-meal or whether food and drink is present. The determination unit 31*a* supplies the determination result to the control signal output control unit 31*b*.

Next, in step S307, the determination unit 31*a* determines whether the user 8 is mid-meal or whether food and drink is present and further whether it is possible to individually identify the types of food and drink (for example, the type of cooked dish on each plate). Since the determination regarding individual identification of the types of food and drink by the determination unit 31*a* is the same as the description of step S107 of FIG. 8 given in the "3-2. Second Lighting Control" section, detailed description is omitted here. The determination unit 31*a* supplies the determination result to the control signal output control unit 31*b*.

Next, if it has been determined that individual identification is not possible (S307/No), in step S309, the control signal output control unit 31*b* carries out control to transmit a control signal for carrying out overall lighting of the food and drink using incandescent lighting to the lighting apparatus 40. By doing so, when the user 8 is having a meal, lighting with incandescent lighting is automatically carried out by the incandescent lighting units 41 of the lighting apparatus 40, which makes the cooking appear much more delicious.

Meanwhile, if it has been determined that individual identification is possible (S307/Yes), in step S312, the control signal output control unit 31*b* of the server 30 carries out control to transmit, to the HMD 1, a control signal for carrying out image processing that individually adds specified lighting effects in accordance with the types of the respective cooked dishes.

In this way, with a combined type, it is possible to transmit separate control signals to appropriate adding units in accordance with the lighting content, such as by transmitting a control signal (a signal for lighting control) to the lighting apparatus 40 when carrying out overall lighting and transmitting a control signal (a signal for image processing) to the HMD 1 when carrying out individual lighting.

3-5. Combined-Type Mode Compatibility

Although various operation control of the lighting system according to the present embodiment has been described above, in each case for overall lighting, an incandescent lighting effect is added to make cooking appear much more delicious and for individual lighting, different lighting effects are individually added in accordance with whether such foods are generally healthy.

Here, the lighting system according to the present embodiment may be configured so that it is possible for the user to set one or more dining modes N that decide what lighting effect is to be added to food and drink. As the dining modes N, the following can be given as examples of modes for achieving specified objects.

Dining mode 1: Mode for making cooking look more delicious
Dining mode 2: Appetite suppressing ("diet") mode
Dining mode 3: Disease prevention mode
Dining mode 4: Strength promoting mode
Dining mode 5: Anorexia prevention mode Operation processing of the lighting system when such dining modes have been set will now be described. Although the setting of dining modes is capable of being adapted to any of the "3-1. First Lighting Control", "3-2. Second Lighting Control", "3-3. Image Processing" and "3-4. Combined Type", the case where the combined type is compatible with the setting of such dining modes is described here as an example.

Figure 11:
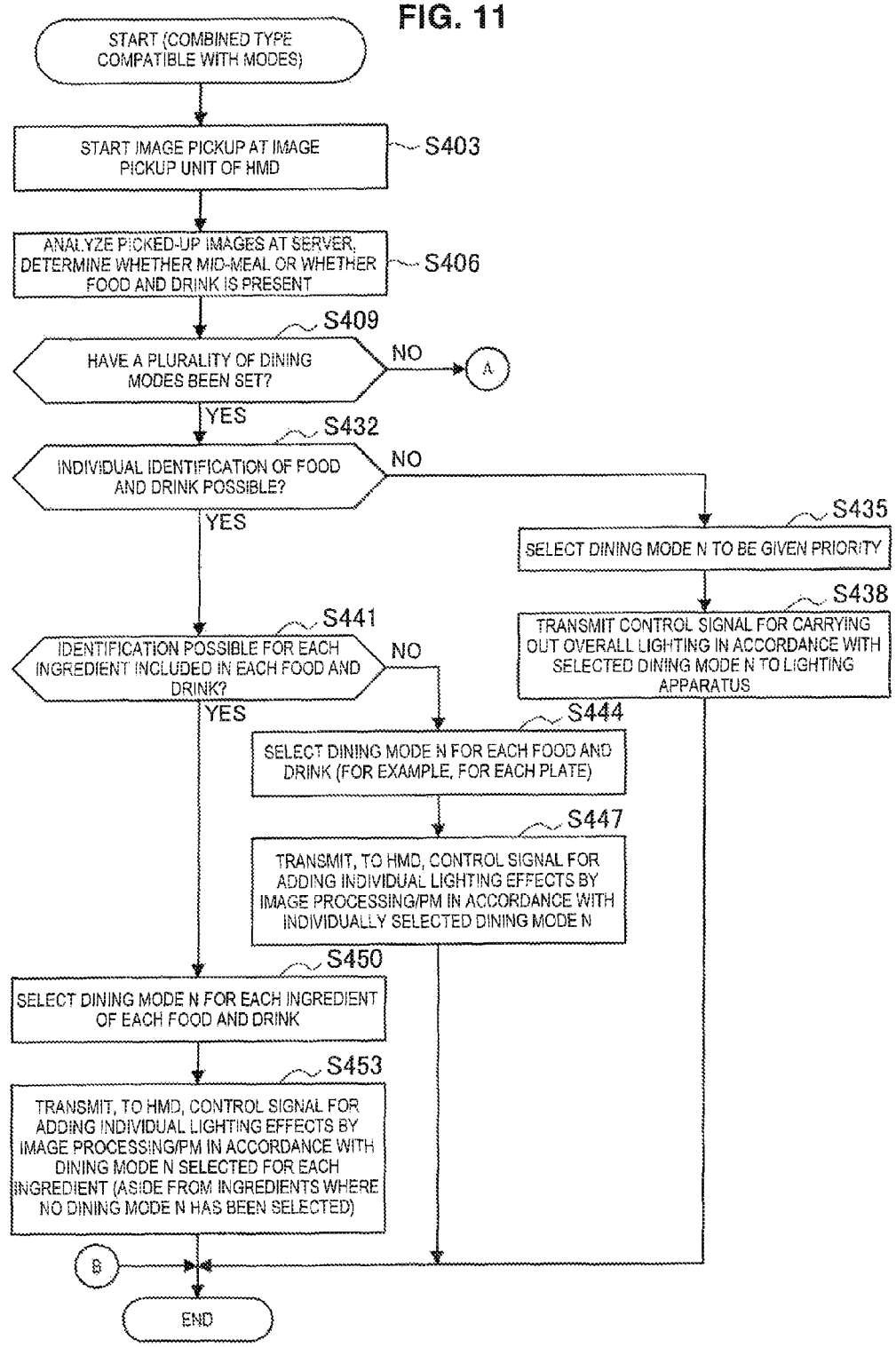
FIG. 11 is a flowchart showing operation processing where the combined type is compatible with modes according to the present embodiment.
Figure 12:
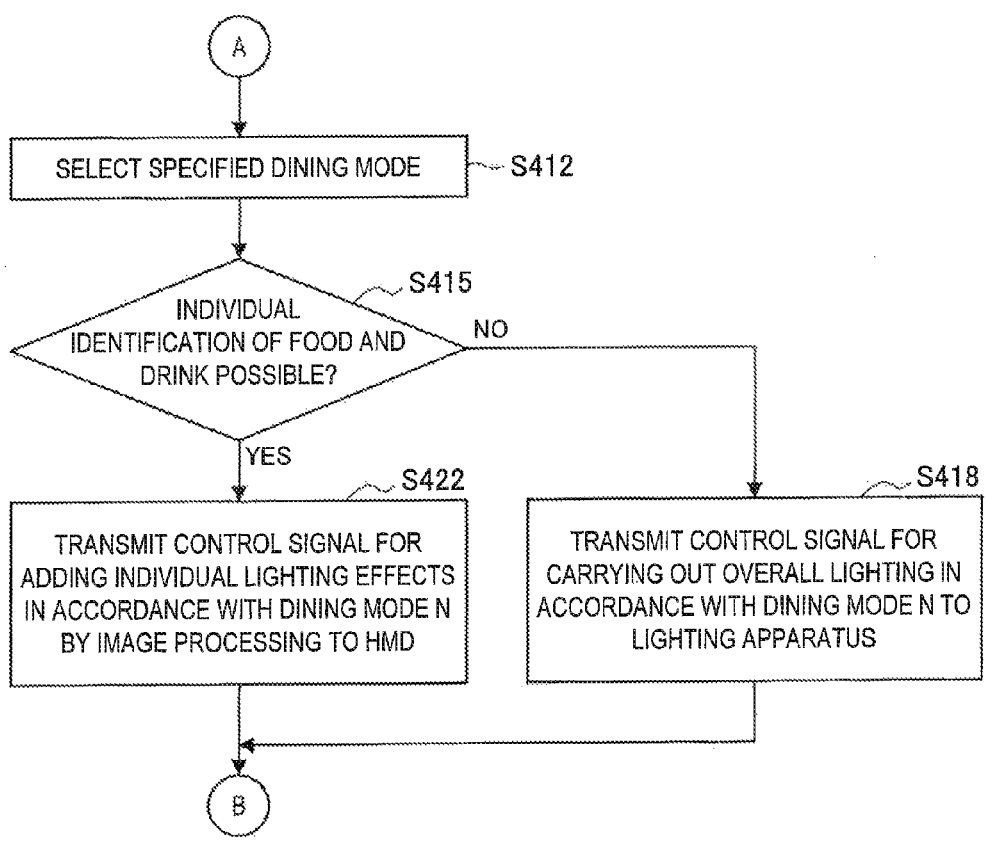
FIG. 12 is a flowchart showing operation processing where the combined type is compatible with modes according to the present embodiment.

FIG. 11 and FIG. 12 are flowcharts showing operation processing where the combined type is compatible with modes according to the present embodiment. As shown in FIG. 11, in step S403, first the HMD 1 starts image pickup by the image pickup unit 3. The HMD 1 transmits the picked-up images that have been picked up to the server 30.

Next, in step S406, the determination unit 31*a* of the server 30 analyzes the picked-up images transmitted from the HMD 1 and determines whether the user is mid-meal or whether food and drink is present. The determination unit 31*a* supplies the determination result to the control signal output control unit 31*b*.

Next, in step S409, the control signal output control unit 31*b* further determines, if the determination unit 31*a* has determined that the user 8 is mid-meal or that food and drink is present, if a plurality of dining modes have been set. The dining modes may be set in the HMD 1 by the user 8, and information showing the dining modes that have been set is transmitted from the HMD 1 to the server 30 together with the picked-up images in S403 described above. Also, the dining modes may be automatically set in accordance with the health state of the user 8 or medical information. The health state of the user may be detected in real time by a biological sensor (not shown) attached to the user 8.

If a plurality of dining modes have not been set (S409/No), in step S412 shown in FIG. 12, the control signal output control unit 31*b* selects a specified (single) dining mode N. The specified dining mode N may be a dining mode N selected at the HMD 1 by the user 8 and, in a case where the user 8 has made no selection, may be a (default) dining mode N set in advance at the server 30.

Next, in step S415, the determination unit 31*a* determines whether it is possible to individually identify the types of food and drink appearing in the picked-up images (for example, the types of cooked dish on each plate). Since the determination regarding individual identification of the types of food and drink by the determination unit 31*a* is the same as the description of step S107 of FIG. 8 given in the "3-2. Second Lighting Control" section, detailed description is omitted here. The determination unit 31*a* supplies the determination result to the control signal output control unit 31*b*.

Next, if it has been determined that individual identification is not possible (S415/No), in step S418, the control signal output control unit 31*b* carries out control to transmit a control signal for carrying out overall lighting in accordance with the selected dining mode N to the lighting apparatus 40. As examples, if the dining mode is "Dining mode 1: Mode for making cooking look more delicious", the control signal output control unit 31*b* has overall lighting carried out using incandescent lighting to make the cooking look more delicious and if the dining mode is "Dining mode 2: Appetite suppressing ("diet") mode", the control signal output control unit 31*b* has overall lighting carried out using fluorescent lighting to make the cooking look less visually delicious. Also, if the dining mode is "Dining mode 3: Disease prevention mode", "Dining mode 4: Strength promoting mode", or "Dining mode 5: Anorexia prevention mode", overall lighting is carried out using incandescent lighting to stimulate the appetite. By doing so, when the user is having a meal, lighting is automatically carried out by the lighting apparatus 40 using incandescent lighting/fluorescent lighting in accordance with the selected dining mode N, thereby improving the usability of the lighting system.

Meanwhile, if it has been determined that individual identification is possible (S415/Yes), in step S422, the control signal output control unit 31*b* of the server 30 carries out control to transmit, to the HMD 1, a control signal for carrying out image processing that individually adds specified lighting effects based on the types of respective cooked dishes in accordance with the selected dining mode N. As one example, if the dining mode is "Dining mode 2: Appetite suppressing ("diet") mode", a fluorescent lighting effect is individually added to cooked dishes that are imagined to be high calorie out of the various cooked dishes to reduce the appetite. If the dining mode is "Dining mode 3: Disease prevention mode", incandescent/fluorescent lighting effects are individually added to cooked dishes that are generally favorable/unfavorable for disease prevention out of the various cooked dishes to stimulate/reduce the appetite. At such time, the control signal output control unit 31b may acquire medical information (such as a medical history) or physical condition information (or health state) of the user 8 and add incandescent/fluorescent lighting effects in accordance with whether the respective cooked dishes are good for the user 8. By doing so, when the user 8 is having a meal, incandescent/fluorescent lighting effects are added by image processing of the display control unit (image processing unit) of the HMD 1 based on the types of the respective cooked dishes and in accordance with the selected dining mode N, there by significantly improving the usability of the lighting system.

Next, if it has been determined in step S409 in FIG. 11 that a plurality of dining modes have been set (S409/Yes), in step S432, the determination unit 31a of the server 30 determines whether it is possible to individually identify the types of food and drink appearing in the picked-up images (for example, the types of cooked dish on each plate).

Next, if it has been determined that individual identification is not possible (S432/No), in step S435 the control signal output control unit 31b selects the dining mode N to be given priority. For example, if "Dining mode 1: Mode for making cooking look more delicious" and "Dining mode 2: Appetite suppressing ("diet") mode" have been set, the control signal output control unit 31b may select "Dining mode 2: Appetite suppressing ("diet") mode" as the dining mode N to be given priority.

Next, in step S438, the control signal output control unit 31b carries out control to transmit a control signal for carrying out overall lighting using incandescent lighting/fluorescent lighting in accordance with the selected dining mode to the lighting apparatus 40. In this way, if overall lighting is carried out in a case where a plurality of dining modes N have been set, one dining mode is selected with priority and overall lighting is carried out in accordance with the selected dining mode.

After this, if individual identification is possible (S432/Yes), in step S441, the determination unit 31a determines whether it is possible to further individually identify the types of ingredients included in the food and drink (as one example, types of the ingredients on each plate).

Next, if it has been determined that identification of each ingredient is not possible (S441/No), in step S444, the control signal output control unit 31b selects the dining mode N for each food and drink in accordance with the types of food and drink. As one example, if "Dining mode 1: Mode for making cooking look more delicious" and "Dining mode 2: Appetite suppressing ("diet") mode" have been set, the control signal output control unit 31b selects Dining mode 2 for high calorie cooking that have an influence on diet and selects Dining mode 1 for low calorie dishes.

Next, in step S447, the control signal output control unit 31b of the server 30 generates a control signal for individually (i.e., to each cooked dish) adding specified lighting effects via image processing/PM at the HMD 1 in accordance with the dining mode N that is individually selected for each cooked dish, and transmits the control signal to the HMD 1. In this way, the lighting system according to the present embodiment is capable of selecting a different dining mode N for each type of cooking that has been identified and adding a lighting effect in accordance with the selected dining mode N.

Meanwhile, if it has been determined that it is possible to identify each ingredient (S441/Yes), in step S450, the control signal output control unit 31b selects the dining mode N for each ingredient included in the food and drink (for example, for each ingredient on a plate) in accordance with the type of each ingredient.

Next, in step S453, the control signal output control unit 31b of the server 30 generates a control signal for individually (i.e., for each ingredient) adding a specified lighting effect via image processing/PM at the HMD 1 in accordance with the dining mode N that has been individually selected for each ingredient and transmits the control signal to the HMD 1. In this way, the lighting system according to the present embodiment is capable of selecting a different dining mode N for each ingredient included in the identified cooking and adding a lighting effect in accordance with the selected dining mode N.

This completes the description of the operation processing when dining modes have been set for the combined type. Note that in S447 and S453 described above, cooking or ingredients for which a dining mode is not selected may also be included, and in such case no lighting effect is added to such cooking or ingredients.

Also, when an incandescent lighting effect is added by image processing or projection in "3-2. Second Lighting Control" to "3-5. Combined Type Mode Compatibility", it is also possible to further add images for positively presenting the state of food and drink. Similarly, when a fluorescent lighting effect is added by image processing or projection in "3-2. Second Lighting Control" to "3-5. Combined Type Mode Compatibility", it is also possible to further add images for negatively presenting the state of food and drink.

4. Other Embodiments

Although as shown in FIG. 1, the lighting system according to the present embodiment described above has a (cloud type) configuration including the HMD 1 and the server 30 (information processing apparatus), the configuration of the lighting system according to the present embodiment is not limited to such. For example, as a lighting system according to another embodiment, if the HMD 1 further includes the functions of the main control unit 31 of the server 30, the HMD 1 will be capable of carrying out the operation processing shown in FIG. 7 to FIG. 12 by itself. This is described in more detail below with reference to FIG. 13.

Figure 13:
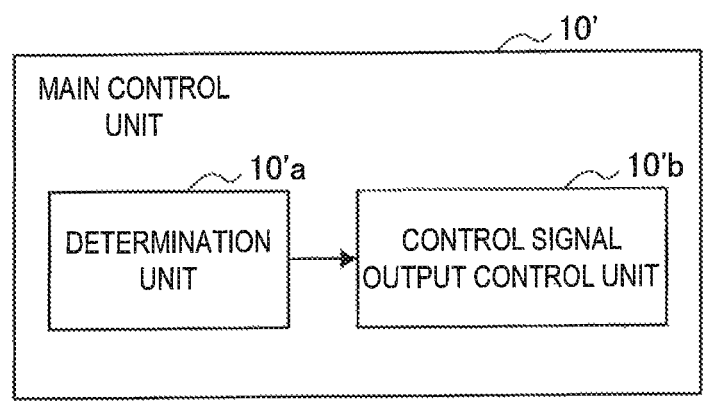
FIG. 13 is a block diagram showing the functional configuration of a main control unit of an HMD according to another embodiment of the present disclosure.

FIG. 13 is a block diagram showing the functional configuration of a main control unit 10' of the HMD 1 according to another embodiment. As shown in FIG. 13, the main control unit 10' of the HMD 1 (information processing apparatus) according to this other embodiment functions as a determination unit 10'a and a control signal output control unit 10'b.

In the same way as the determination unit 31a of the server 30 according to the embodiment which was described above with reference to FIG. 3, the determination unit 10'a is capable of determining, based on the picked-up images picked up by the image pickup unit 3 of the HMD 1, whether the user is consuming food and drink or whether food and drink is present in the periphery of the user. The determination result of the determination unit 10'a is supplied to the control signal output control unit 10'b.

Also, in the same way as the control signal output control unit 31b according to the embodiment described above, the control signal output control unit 10'b carries out control to output a control signal to an adding unit that adds a specified lighting effect to the food and drink or picked-up images of the food and drink in accordance with the determination result of the determination unit 10'a. As examples, such adding unit is the lighting apparatus 40, the display control unit 17 (image processing unit) of the HMD 1, or the projecting unit 7. The communication unit 21 of the HMD 1 according to this other embodiment is capable of transmitting a control signal to the lighting apparatus 40.

The HMD 1 (information processing apparatus) according to this other embodiment of the present disclosure is capable of carrying out the operation processing shown in FIG. 7 to FIG. 12 to add an incandescent/fluorescent lighting effect to food and drink.

5. Conclusion

As described above, the lighting systems according to the above embodiments of the present disclosure are capable of providing dietary support by adding a specified lighting effect (an incandescent lighting effect or a fluorescent lighting effect) to food and drink when the user is mid-meal or food and drink is present.

Although preferred embodiments of the present disclosure have been described in detail above with reference to the attached drawings, the present disclosure is not limited to such embodiments. It should be understood by those skilled in the art that various modifications, combinations, sub-combinations and alterations may occur depending on design requirements and other factors insofar as they are within the scope of the appended claims or the equivalents thereof.

As one example, it is possible to generate computer programs for causing hardware, such as a CPU, a ROM, and a RAM, incorporated in the HMD 1 and the server 30 to realize the functions of the HMD 1 and the server 30 described above. It is also possible to provide a computer-readable storage medium on which such computer programs are stored.

Also, although the HMD 1 has been given in this specification as one example of a terminal apparatus including the image pickup unit 3 and the display units 2, a terminal apparatus according to the present disclosure is not limited to the HMD 1. As other examples, the terminal apparatus may be a smartphone, a mobile telephone terminal, a PDA (Personal Digital Assistant), a PC (Personal Computer), a tablet terminal, or the like.

Also, although the addition of images for positively or negatively presenting the state of food and drink was described in the above embodiment with reference to FIG. 5 and FIG. 6, the lighting system according to the present embodiment may also reproduce sounds and odors using the audio output unit 5 of the HMD 1 and/or an odor reproduction unit (not shown). By doing so, it is possible to give a much more delicious impression of the cooking or to give an impression that the cooking is not delicious. The sizzling sound of grilling meat, the smell of charring, and the sound of ice cubes hitting a glass can be given as examples of sounds and smells for positively presenting the state of food and drink.

Aside from newly adding images for positively presenting the state of food and drink, the lighting system according to the present embodiment may virtually move ingredients using image processing or projection mapping so as to make the ingredients appear to be fresh. As one example, in the case of live seafood, the lighting system according to the present embodiment may make the head of a fish appear to move.

Additionally, the present technology may also be configured as below.

(1) An information processing apparatus including:
a determination unit configured to determine whether a user is consuming food and drink or whether food and drink is present in a periphery of the user; and
a control unit configured to carry out control to output a control signal to an adding unit that adds a lighting effect to one of the food and drink present in a real space and picked-up images of the food and drink in accordance with a determination result of the determination unit.
(2) The information processing apparatus according to (1),
wherein the determination unit is configured to further individually identify types of the food and drink, and
the control unit is configured to output a control signal for adding a lighting effect in accordance with the individually identified types of the food and drink to the adding unit.
(3) The information processing apparatus according to (2),
wherein the determination unit is configured to further identify a type of each ingredient included in the food and drink, and
the control unit is configured to output a control signal for adding a lighting effect to each identified ingredient in the food and drink in accordance with the type.
(4) The information processing apparatus according to (3),
wherein the control unit is configured to output, to the adding unit, a control signal for adding a lighting effect to each ingredient included in the food and drink by image signal processing on picked-up images of the food and drink.
(5) The information processing apparatus according to any one of (1) to (4),
wherein the determination unit is configured to determine whether the user is consuming food and drink or whether food and drink is present in the periphery of the user based on picked-up images produced by image pickup of the periphery of the user.
(6) The information processing apparatus according to any one of (1) to (5),
wherein the adding unit is a lighting unit that lights the food and drink present in the real space.
(7) The information processing apparatus according to any one of (1) to (5),
wherein the adding unit is a projecting unit that adds a lighting effect by projecting onto the food and drink present in the real space.
(8) The information processing apparatus according to any one of (1) to (5),
wherein the adding unit is an image signal processing unit that adds a lighting effect by carrying out image processing on picked-up images of the food and drink.
(9) The information processing apparatus according to any one of (1) to (8),
wherein the control unit is operable when it has been determined that the user is consuming food and drink or it has been determined that food and drink is present in the periphery of the user, to output a control signal for adding a specified lighting effect to one of the food and drink present in the real space and picked-up images of the food and drink to the adding unit.
(10) The information processing apparatus according to any one of (1) to (9),
wherein the control unit is configured to generate the control signal in accordance with a specified mode which has been set out of a plurality of modes.
(11) The information processing apparatus according to (10),
wherein the plurality of modes are modes for achieving specified objectives.

(12) The information processing apparatus according to (10) or (11),
wherein the specified mode is set in accordance with a health state or medical information of the user.
(13) The information processing apparatus according to (12),
wherein the specified mode is set in accordance with a real-time health state based on a detection result of a biological sensor attached to the user.
(14) The information processing apparatus according to any one of (1) to (13),
wherein the control signal is a control signal for adding a lighting effect that causes changes to shadows or colors of the food and drink.
(15) The information processing apparatus according to any one of (1) to (14),
wherein the control unit is configured to output, to the adding unit, a control signal indicating addition, to one of the food and drink present in the real space and picked-up images of the food and drink, of an image for positively or negatively presenting a state of food and drink using projection or image processing.
(16) The information processing apparatus according to any one of (1) to (15),
wherein the control unit is configured to output, to the adding unit, a control signal for adding a lighting effect to a dish containing the food and drink and is present in a real space or a periphery of the dish or to picked-up images of a dish containing the food and drink or a periphery of the dish.
(17) A storage medium having a program stored therein, the program causing a computer to function as:
a determination unit configured to determine whether a user is consuming food and drink or whether food and drink is present in a periphery of the user, and
a control unit configured to carry out control to output a control signal to an adding unit that adds a lighting effect to one of the food and drink present in a real space and picked-up images of the food and drink in accordance with a determination result of the determination unit.

What is claimed is:

1. An information processing apparatus comprising:
a determination unit configured to determine whether a user is consuming food and drink or whether food and drink is present in a periphery of the user; and
a control unit configured to carry out control to output a control signal to an adding unit that adds a lighting effect to one of the food and drink present in a real space and picked-up images of the food and drink in accordance with a determination result of the determination unit,
wherein the control unit carries out the control to output the control signal to the adding unit to selectively add either a first lighting effect for increasing a visual appeal of the food and drink and which is generated by a first light source type or a second lighting effect for decreasing the visual appeal of the food and drink and which is generated by a second light source type different than the first light source type, the selection being made between the first lighting effect and the second lighting effect in accordance with the determination result, and
wherein the determination unit, the control unit, and the adding unit are each implemented via at least one processor.

2. The information processing apparatus according to claim 1,
wherein the determination unit is configured to further individually identify types of the food and drink, and
the control unit is configured to output a control signal for adding a lighting effect in accordance with the individually identified types of the food and drink to the adding unit.

3. The information processing apparatus according to claim 2,
wherein the determination unit is configured to further identify a type of each ingredient included in the food and drink, and
the control unit is configured to output a control signal for adding a lighting effect to each identified ingredient in the food and drink in accordance with the type.

4. The information processing apparatus according to claim 3,
wherein the control unit is configured to output, to the adding unit, a control signal for adding a lighting effect to each ingredient included in the food and drink by image signal processing on picked-up images of the food and drink.

5. The information processing apparatus according to claim 1,
wherein the determination unit is configured to determine whether the user is consuming food and drink or whether food and drink is present in the periphery of the user based on picked-up images produced by image pickup of the periphery of the user.

6. The information processing apparatus according to claim 1,
wherein the adding unit is a lighting unit that lights the food and drink present in the real space.

7. The information processing apparatus according to claim 1,
wherein the adding unit is a projecting unit that adds a lighting effect by projecting onto the food and drink present in the real space.

8. The information processing apparatus according to claim 1,
wherein the adding unit is an image signal processing unit that adds a lighting effect by carrying out image processing on picked-up images of the food and drink.

9. The information processing apparatus according to claim 1,
wherein the control unit is operable when it has been determined that the user is consuming food and drink or it has been determined that food and drink is present in the periphery of the user, to output a control signal for adding a specified lighting effect to one of the food and drink present in the real space and picked-up images of the food and drink to the adding unit.

10. The information processing apparatus according to claim 1,
wherein the control unit is configured to generate the control signal in accordance with a specified mode which has been set out of a plurality of modes.

11. The information processing apparatus according to claim 10,
wherein the plurality of modes are modes for achieving specified objectives.

12. The information processing apparatus according to claim 10,
wherein the specified mode is set in accordance with a health state or medical information of the user.

13. The information processing apparatus according to claim 12, wherein the specified mode is set in accordance with a real-time health state based on a detection result of a biological sensor attached to the user.

14. The information processing apparatus according to claim 1,
wherein the control signal is a control signal for adding a lighting effect that causes changes to shadows or colors of the food and drink.

15. The information processing apparatus according to claim 1,
wherein the control unit is configured to output, to the adding unit, a control signal indicating addition, to one of the food and drink present in the real space and picked-up images of the food and drink, of an image for positively or negatively presenting a state of food and drink using projection or image processing.

16. The information processing apparatus according to claim 1,
wherein the control unit is configured to output, to the adding unit, a control signal for adding a lighting effect to a dish containing the food and drink and is present in a real space or a periphery of the dish or to picked-up images of a dish containing the food and drink or a periphery of the dish.

17. A non-transitory computer-readable storage medium having embodied thereon a program, which when executed by a computer causes the computer to execute a method, the method comprising:
determining whether a user is consuming food and drink or whether food and drink is present in a periphery of the user; and
controlling, in accordance with a result of the determination, a lighting effect to be selectively added to one of the food and drink present in a real space and picked-up images of the food and drink,
wherein either a first lighting effect for increasing a visual appeal of the food and drink and which is generated by a first light source type or a second lighting effect for decreasing the visual appeal of the food and drink and which is generated by a second light source type different than the first light source type is controlled to be added, in accordance with the result of the determination.

18. The information processing apparatus according to claim 1,
wherein the control unit carries out the control to output the control signal to the adding unit to add the first lighting effect, when operation is in a first mode for appetite stimulation, and
wherein the control unit carries out the control to output the control signal to the adding unit to add the second lighting effect, when operation is in a second mode for appetite suppression.

19. The information processing apparatus according to claim 1,
wherein the first light source type is an incandescent lighting source, and the second light source type is a fluorescent lighting source.

20. The non-transitory computer-readable storage medium according to claim 17,
wherein the first lighting effect is added when operation is in a first mode for appetite stimulation, and
wherein the second lighting effect is added when operation is in a second mode for appetite suppression.

* * * * *